US011161917B2

(12) United States Patent
Tanaka et al.

(10) Patent No.: US 11,161,917 B2
(45) Date of Patent: Nov. 2, 2021

(54) METHOD FOR PRODUCING CELLULOSE DERIVATIVE, AND CELLULOSE DERIVATIVE

(71) Applicant: NEC Corporation, Tokyo (JP)

(72) Inventors: Shukichi Tanaka, Tokyo (JP); Kiyohiko Toyama, Tokyo (JP); Masatoshi Iji, Tokyo (JP)

(73) Assignee: NEC CORPORATION, Tokyo (JP)

( * ) Notice: Subject to any disclaimer, the term of this patent is extended or adjusted under 35 U.S.C. 154(b) by 177 days.

(21) Appl. No.: 16/159,962

(22) Filed: Oct. 15, 2018

(65) Prior Publication Data

US 2019/0048099 A1    Feb. 14, 2019

Related U.S. Application Data

(62) Division of application No. 14/910,130, filed as application No. PCT/JP2014/071189 on Aug. 11, 2014, now abandoned.

(30) Foreign Application Priority Data

Aug. 23, 2013  (JP) ................. 2013-173439

(51) Int. Cl.
*C08B 3/16*     (2006.01)
*C08L 1/14*     (2006.01)
*C08B 1/02*     (2006.01)

(52) U.S. Cl.
CPC .............. *C08B 3/16* (2013.01); *C08B 1/02* (2013.01); *C08L 1/14* (2013.01)

(58) Field of Classification Search
CPC .................... C08B 3/16; C08B 1/02
See application file for complete search history.

(56) References Cited

U.S. PATENT DOCUMENTS

| | | | | |
|---|---|---|---|---|
| 4,981,960 A | 1/1991 | Diamantoglou | ....... | B01D 71/08 536/100 |
| 9,039,826 B2 | 5/2015 | Tanaka | ............... | C07F 7/1836 106/200.1 |
| 2006/0188667 A1* | 8/2006 | Watanabe | ............... | C08J 5/18 428/1.33 |

FOREIGN PATENT DOCUMENTS

| | | |
|---|---|---|
| JP | 2009-091542 A | 4/2009 |
| JP | 2009-270073 A | 11/2009 |
| JP | 2010-121121 A | 6/2010 |
| WO | 2010/047351 A1 | 4/2010 |
| WO | 2011/043279 A1 | 4/2011 |
| WO | 2011/043280 A1 | 4/2011 |

OTHER PUBLICATIONS

Vaca-Garcia et al "Cellulose Esterification with fatty acids and Acetic Anhydride in Lithium Chloride/N,N-Dimethylacetamide Medium" Journal of the American Oil Chemists' Society, 1998, vol. 75, No. 2, p. 135-142) (Year: 1998).*
C. Vaca-Garcia et al., "Cellulose Esterification with Fatty Acids and Acetic Anhydride in Lithium Chloride/N,N-Dimethylacetamide Medium", Journal of the American Oil Chemists' Society, 1998, vol. 75, No. 2, p. 135-142.
C. Vaca-Garcia et al., "Solvent-free fatty acid acylation of cellulose and lignocellulosic wastes. Part 2: reactions with fatty acids", Bioresource Technology, 1999, vol. 70, p. 315-319.
International Search Report for PCT Application No. PCT/JP2014/071189, dated Nov. 4, 2014.
Communication dated Jul. 24, 2018 from the Japanese Patent Office in counterpart application No. 2015-532820.
C. Vaca-Garcia et al., "Cellulose Esterification with Fatty Acids and Acetic Anhydride in Lithium Chloride/N,N-Dimethylacetamide Medium", Journal of the American Oil Chemists' Society, 1998, vol. 75, No. 2, P. 315-319.
C. Vaca-Garcia et al.,"Solvent-free fatty acid acylation of cellulose and lignocellulosic wastes. Part 2: reactions with fatty acids", Bioresource Technology, 1999, vol. 70, P. 135-142.
Kagakudaijiten, edited by Kagakudaijiten Hensyuiinkai, vol. 2, p. 559, Aug. 15, 1989, Kyoritsu Shuppan Co., Ltd. (4 pages total), previously filed Oct. 8, 2020.

* cited by examiner

*Primary Examiner* — Shaojia A Jiang
*Assistant Examiner* — Everett White
(74) *Attorney, Agent, or Firm* — Sughrue Mion, PLLC

(57) ABSTRACT

A method for producing a cellulose derivative, including reacting a mixed acid anhydride having two particular types of acyl groups with cellulose in the presence of a base catalyst in an organic solvent having an electron pair-donating property to form a cellulose derivative with the two types of acyl groups derived from the mixed acid anhydride, the acyl groups being introduced at hydroxy groups in the cellulose.

14 Claims, No Drawings

METHOD FOR PRODUCING CELLULOSE DERIVATIVE, AND CELLULOSE DERIVATIVE

This application is a divisional application of U.S. patent application Ser. No. 14/910,130 filed on Feb. 4, 2016, which is a National Stage Entry of PCT/JP2014/071189 filed on Aug. 11, 2014, which claims priority from Japanese Patent Application 2013-173439 filed on Aug. 23, 2013, the contents of all of which are incorporated herein by reference, in their entirety.

TECHNICAL FIELD

The present invention relates to a method for producing a cellulose derivative and a cellulose derivative.

BACKGROUND ART

Bioplastics derived from plants as the raw material can contribute to countermeasures against the depletion of petroleum and the global warming, and therefore are beginning to be used for durable products such as an electronic device and an automobile, as well as general products such as a package, a container and a fiber.

However, all of the conventional bioplastics such as polylactic acid, polyhydroxyalkanate and a starch-modified product are derived from a starch-based material, i.e., an edible portion, as the raw material. Accordingly, from the concern about food shortage in the future, a new bioplastic derived from a non-edible portion as the raw material in place of an edible portion is required to be developed.

A representative example of the non-edible portion available as a raw material for bioplastics is cellulose, which is a main component of woods and vegetation, and various bioplastics utilizing it as the raw material have been developed and commercially produced.

However, a step of chemically modifying cellulose to resinify is complex and time-consuming and further requires much production energy, which makes production costs of a cellulose resin high. Moreover, the durability (such as strength, heat resistance and water resistance) of previously produced resins is not sufficient, and therefore the application thereof is limited.

Cellulose contained in woods or the like, which is bonding to lignin or hemicellulose, is produced as pulp by chemically separating them by using an agent. Meanwhile, cotton substantially consists of cellulose and therefore can be directly used as a raw material for cellulose.

Such cellulose is a polymer in which β-glucose molecules are polymerized linearly. Due to the presence of three hydroxy groups in the β-glucose unit constituting cellulose, hydrogen bonds are formed intermolecularly (interchain) and intramolecularly. Accordingly, cellulose itself has no thermoplasticity and low solubility to a solvent except for special solvents. Further, cellulose has high water absorbability and low water resistance because it has many hydroxy groups, which are hydrophilic groups.

In order to modify such cellulose, various considerations have been made.

As a method for modifying cellulose, a method is known in which the hydrogen atom in a hydroxy group in cellulose is replaced with a short-chain acyl group such as an acetyl group. According to this method, the number of the hydroxy groups can be reduced to thereby lower the formation rate of intermolecular hydrogen bonds. Further, it has been considered to introduce a long-chain organic group having a larger number of carbon atoms in addition to a short-chain acyl group such as an acetyl group to thereby produce a cellulose derivative having good thermoplasticity or water resistance.

For example, Patent Literature 1 describes a cellulose derivative in which at least some of the hydrogen atoms in the hydroxy groups in cellulose is replaced with a short-chain acyl group (e.g., an aliphatic acyl group having 2 to 4 carbon atoms) and a long-chain acyl group (e.g., an aliphatic acyl group having 5 to 20 carbon atoms), and discloses that the cellulose derivative has a low water absorption rate and good thermoplasticity, strength and rupture elongation, and is suitable for molding processing.

Patent Literature 2 describes a cellulose derivative with cardanol introduced thereinto, and discloses that the cellulose derivative has improved thermoplasticity, mechanical properties and water resistance.

Patent Literature 3 describes a cellulose derivative with cardanol and abietic acid introduced thereinto, and discloses that the cellulose derivative has improved thermoplasticity, mechanical properties and water resistance.

Non Patent Literature 1 describes a cellulose derivative with a short-chain acyl group and a long-chain acyl group simultaneously introduced thereinto by using a special solvent (N-dimethylacetamide/lithium chloride system) for dissolving cellulose therein.

Non Patent Literature 2 describes a derivative with a short-chain acyl group and a long-chain acyl group simultaneously introduced thereinto by reacting a mixed acid anhydride constituted of a short-chain carboxylic acid and a long-chain carboxylic acid with cellulose in an acid catalyst system.

CITATION LIST

Patent Literature

Patent Literature 1:
   JP2010-121121A
Patent Literature 2:
   WO2011/043279
Patent Literature 3:
   WO2011/043280

Non Patent Literature

Non Patent Literature 1:
   Journal of the American Oil Chemists' Society Vol. 75 p 315-319 (1998)
Non Patent Literature 2:
   Bioresource Technology Vol. 70 p 135-142 (1999)

SUMMARY OF INVENTION

Technical Problem

In the methods for production of a cellulose-based resin according to the techniques described in the above-mentioned Patent Literatures 1 to 3, a short chain and a long chain are introduced in a two-step reaction process utilizing hydroxy groups in cellulose, and therefore the methods have the problem of requiring a large energy load in the whole process. In addition, in the step of introducing a long chain, an acid chloride corresponding to the long chain is used as a raw material, which causes the problem of the generation of a large amount of a difficult-to-reuse by-product salt. Further, the technique described in Non Patent Literature 1 suffers from the problem of difficulty in recovering lithium chloride used as a dissolution aid for cellulose. Furthermore, the technique described in Non Patent Literature 2 has the problems of a low efficiency of introduction of the long-chain acyl group and possibility of the cleavage of the cellulose main chain caused by the acid catalyst.

With regard to a methodology in which a short-chain acyl group and a long-chain acyl group are introduced at hydroxy groups in cellulose by using an acid anhydride, it is known that a base catalyst is also available in place of an acid catalyst. However, in the case of utilizing a base catalyst, a long-chain acylating agent is less reactive than that in the case of utilizing an acid catalyst, and hence it is difficult to obtain a cellulose derivative with a sufficient amount of long-chain acyl group introduced thereinto to develop desired properties.

An object of the present invention is to provide a method which enables to efficiently produce a cellulose derivative with improved properties, and to provide a cellulose derivative with improved properties.

Solution to Problem

According to one aspect of the present invention is provided a method for producing a cellulose derivative, comprising reacting a mixed acid anhydride represented by the following chemical formula (A):

[Formula 1]

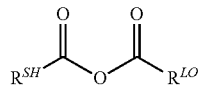

(A)

wherein $R^{SH}$ represents an organic group having 1 to 3 carbon atom(s); and $R^{LO}$ represents an organic group having an electron-withdrawing property,
with cellulose in the presence of a base catalyst in an organic solvent having an electron pair-donating property to form a cellulose derivative with a first acyl group (—$COR^{SH}$) and a second acyl group (—$COR^{LO}$) introduced at hydroxy groups in the cellulose.

According to another aspect of the present invention is provided a cellulose derivative produced by the above method for production.

According to another aspect of the present invention is provided a cellulose derivative with a first acyl group and a second acyl group introduced at at least some of hydroxy groups contained in cellulose; wherein the first acyl group is an acyl group having 2 to 4 carbon atoms; and the second acyl group is an acyl group represented by the following chemical formula (B):

(B)

wherein —OR represents an organic group having 1 to 24 carbon atom(s) other than a cardanoxy group.

According to another aspect of the present invention is provided a cellulose-based resin composition containing the above cellulose derivative as a base resin.

According to another aspect of the present invention is provided a molded object obtained by molding the above cellulose-based resin composition.

Advantageous Effects of Invention

According to an exemplary embodiment, a method which enables to efficiently produce a cellulose derivative with improved properties can be provided, and a cellulose derivative with improved properties can be provided.

DESCRIPTION OF EMBODIMENTS

In the method for production according to an exemplary embodiment of the present invention, a mixed acid anhydride constituted of a first carboxylic acid (e.g., a short-chain carboxylic acid) and a second carboxylic acid (e.g., a long-chain carboxylic acid), which are different to each other in acidity, is reacted with cellulose in the presence of a base catalyst in an organic solvent satisfying particular conditions, and thereby there can be obtained a cellulose derivative with a first acyl group (e.g., a short-chain acyl group) and a second acyl group (e.g., a long-chain acyl group) derived from the mixed acid anhydride, the acyl groups being introduced at hydroxy groups in the cellulose. According to this method, a desired acyl group (e.g., a long-chain acyl group) can be directly introduced into cellulose at a high efficiency and a cellulose derivative with properties (such as thermoplasticity, mechanical properties and water resistance) thereof improved can be efficiently produced.

Hereinafter, exemplary embodiments will be further described.

[Cellulose]

Cellulose as the starting raw material is a linear polymer in which β-D-glucose molecules (β-D-glucopyranose) are polymerized through β(1→4) glycoside linkages as shown in the following formula (1). Each of the glucose units constituting cellulose has three hydroxy groups (—OH). In formula (1), n is a natural number and represents the number of repeating units.

[Formula 2]

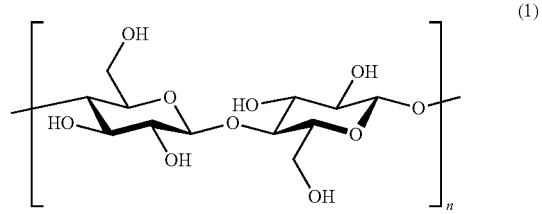

(1)

In the glucose unit constituting cellulose, three hydroxy groups (—OH) are present at positions 2, 3 and 6, respectively, and hydroxy groups in cellulose molecules form intermolecular (interchain) hydrogen bonds, resulting that a sheet-like two-dimensional structure is formed in crystalline cellulose. In this sheet-like two-dimensional structure, for example, as shown in the following, the hydroxy groups at positions 6 and 3 are involved in the formation of the intermolecular (interchain) hydrogen bond. On the other hand, the hydroxy group at position 2 is involved in the formation of an intramolecular (intrachain) hydrogen bond to the hydroxy group at position 6. Further, an intramolecular (intrachain) hydrogen bond is formed also between the oxygen atom forming the ether linkage (—O—) in the pyranose ring and the hydroxy group at position 3.

[Formula 3]

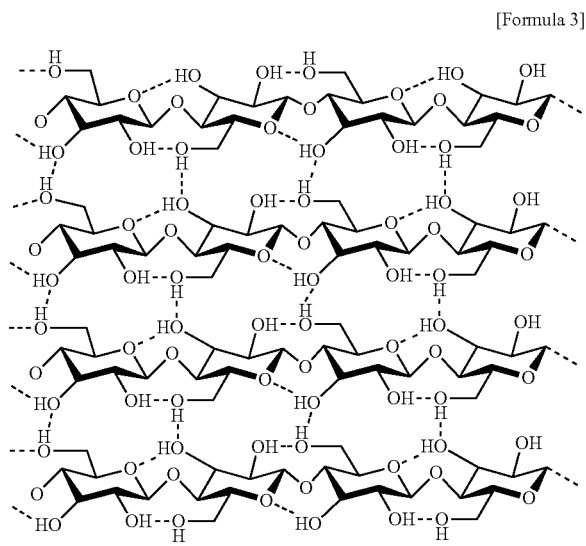

In the method for production according to an exemplary embodiment of the present invention, a cellulose derivative with a first acyl group such as a short-chain acyl group and a second acyl group such as a long-chain acyl group introduced at these hydroxy groups in cellulose as the starting raw material is produced by utilizing acylation reaction.

Cellulose is a main component of vegetation, particularly a cell wall of a plant cell and a plant fiber, and present therein bonding to other components such as lignin. Accordingly, cellulose can be obtained by a treatment for separating other components such as lignin from vegetation. For example, wood pulp such as kraft pulp, which has a high content of cellulose, is prepared by performing chemical separation treatment. Alternatively, cotton (e.g., cotton linter) or pulp (e.g., wood pulp), which has a high content of cellulose, can be used after purification or used directly as the starting raw material.

As for the shape, the size and form of cellulose to be used as the starting raw material, it is preferred to use a cellulose having an appropriate particle size and particle shape in view of reactivity at the acylation reaction, dispersibility in a reaction solvent and handleability at solid-liquid separation. For example, a fibrous or powdery product having a diameter of 1 μm to 100 μm (preferably, 10 μm to 50 μm) or a length of 10 μm to 100 mm (preferably, 100 μm to 10 mm) can be used.

The polymerization degree of cellulose to be used as the starting raw material is preferably in the range of 50 to 5000, more preferably in the range of 100 to 3000, and still more preferably 200 to 3000 in terms of a glucose polymerization degree (average polymerization degree). In the case that the polymerization degree is too low, a cellulose-based resin using a cellulose derivative to be obtained may be insufficient in strength, heat resistance or the like. In contrast, in the case that the polymerization degree is too high, the melt viscosity of a cellulose-based resin using a cellulose derivative to be obtained may be too high to cause an obstacle in molding.

Cellulose to be used as the starting raw material may have been mixed with chitin or chitosan, which has a similar structure to cellulose. In this case, the content of chitin and chitosan based on the whole mixture is preferably 30% by mass or less, preferably 20% by mass or less, and still more preferably 10% by mass or less.

[Mixed Acid Anhydride and Introduction of Acyl Group]

In the method for producing a cellulose derivative according to an exemplary embodiment of the present invention, a first acyl group ($—COR^{SH}$, e.g., a short-chain acyl group) and a second acyl group ($—COR^{LO}$, e.g., a long-chain acyl group) are introduced at hydroxy groups in cellulose by utilizing acylation reaction.

In performing the acylation reaction, a mixed acid anhydride represented by the following formula (A) can be utilized as the main supply source for the second acyl group ($—COR^{LO}$). As this mixed acid anhydride, an acid anhydride constituted of a first carboxylic acid (a short-chain carboxylic acid) and a second carboxylic acid (e.g., a long-chain carboxylic acid) which are different to each other in acidity (acid dissociation constant: pKa) can be used.

[Formula 4]

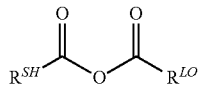

(A)

($R^{SH}$ represents an organic group having 1 to 3 carbon atom(s); and $R^{LO}$ represents an organic group having an electron-withdrawing property.)

In performing the acylation reaction, an acid anhydride (($R^{LO}CO)_2O$) of the second carboxylic acid ($R^{LO}COOH$) can also be utilized as the supply source for the second acyl group ($—COR^{LO}$).

On the other hand, as the supply source for the first acyl group ($—COR^{SH}$: a short-chain acyl group), an acid anhydride (($R^{SH}CO)_2O$) of the first carboxylic acid ($R^{SH}COOH$: a short-chain carboxylic acid) can also be utilized in addition to the mixed acid anhydride represented by formula (A).

The number of carbon atoms of the first acyl group ($—COR^{SH}$) is preferably in the range of 2 to 4, and is more preferably 2 or 3 (an acetyl group, a propionyl group), and still more preferably 2 (an acetyl group). That is, the hydrocarbon group $R^{SH}$ ($R^{SH}$ in the formula) constituting the first acyl group is preferably a saturated chain hydrocarbon group having 1 to 3 carbon atom(s) (a methyl group, an ethyl group, a propyl group, an isopropyl group), more preferably a hydrocarbon group having 1 or 2 carbon atom(s) (a methyl group, an ethyl group), and still more preferably a hydrocarbon group having 1 carbon atom (a methyl group). In accordance with this, the carboxylic acid corresponding to the first acyl group is preferably acetic acid, propionic acid, butyric acid or isobutyric acid, more preferably acetic acid or propionic acid, and still more preferably acetic acid.

In a cellulose derivative produced by using the method for production according to an exemplary embodiment of the present invention, the number of the first acyl groups ($—COR^{SH}$: a short-chain acyl group) per glucose unit (three hydroxy groups) (degree of substitution with the first acyl group: $DS_{SH}$) (average value), that is, the number of hydroxy groups replaced with the first acyl group per glucose unit (degree of substitution at hydroxy group) (average value) is preferably 0.1 or more, more preferably 0.5 or more, and still more preferably 1.0 or more in view of obtaining a sufficient effect of the introduction. In view of introducing a desired amount of the second acyl group, production efficiency or the like, $DS_{SH}$ is preferably 2.9 or less, and more preferably 2.5 or less. The degree of substitution with the first acyl group ($DS_{SH}$) corresponds to the ratio of the number of the first acyl groups bonded to cellulose relative to the cellulose in terms of glucose unit in the cellulose.

By introducing the first acyl group (a short-chain acyl group) at a hydroxy group in cellulose, the van der Waals' force (intermolecular bond) of the cellulose can be reduced. For example, the formation of the intermolecular (interchain) hydrogen bond between the hydroxy groups at position 3 and 6 can be inhibited.

The organic group $R^{LO}$ in the mixed acid anhydride represented by the above formula (A) has an electron-withdrawing property and the electron-withdrawing property is preferably higher than that of the hydrocarbon group $R^{SH}$. This enables to enhance the reactivity of the second acyl group (—$COR^{LO}$) to be introduced at a hydroxy group in cellulose to facilitate the introduction of the second acyl group, which is relatively more difficult to introduce than the first acyl group (a short-chain acyl group).

In such a mixed acid anhydride, the following polarized structure is generated:

[Formula 5]

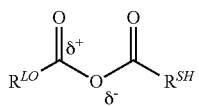

Then, because acylation reaction is a nucleophilic substitution reaction, the following reaction progresses and the second acyl group (—$COR^{LO}$) is preferentially introduced at the hydroxy group (—OH). In the following formula, "R'—O—H" represents cellulose.

[Formula 6]

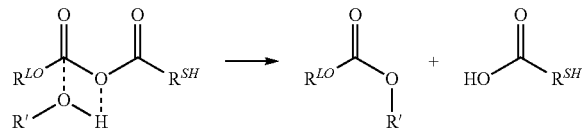

$R^{LO}$ is preferably a group containing at least one divalent group selected from the group consisting of an ether group (—O—), an ester group (—O—CO—), an amide group (—NH—CO—), a urethane group (—NH—CO—O—) and a carbonate group (—O—CO—O—); a first organic group bonding to the carbonyl carbon in the mixed acid anhydride of formula (A); and a second organic group linked to the first organic group through the divalent group. This divalent group is preferably bonding to a carbon atom (a carbon atom in the first organic group) bonding to the carbonyl carbon in the mixed acid anhydride of formula (A). To this carbon atom (the carbon atom bonding to the carbonyl group) is preferably bonding the oxygen atom or nitrogen atom at the terminal of the divalent group (in the case that an oxygen atom is present at the terminal, the oxygen atom is preferably bonding to the above carbon). The total number of carbon atoms constituting the first organic group and the second organic group is preferably in the range of 2 to 48, and more preferably in the range of 2 to 25. The first organic group is preferably a saturated chain hydrocarbon group having 1 to 3 carbon atom(s), and more preferably a methylene group. The second organic group is preferably a hydrocarbon group having 1 to 24 carbon atom(s). The divalent group is preferably an ether group (—O—). Examples of $R^{LO}$ include a methoxymethyl group, an ethoxymethyl group, a phenoxymethyl group, a cardanoxymethyl group and a hydrogenated cardanoxymethyl group. That is, examples of the carboxylic acid corresponding to the second acyl group include methoxyacetic acid, ethoxyacetic acid, phenoxyacetic acid, cardanoxyacetic acid and hydrogenated cardanoxyacetic acids.

Examples of the hydrogenated cardanoxymethyl group include 3-pentadecylphenoxymethyl group (—$CH_2$—O—$C_6H_4$—($CH_2$)$_{14}CH_3$), in which the double bonds in the aromatic ring have not been hydrogenated, and 3-pentadecylcyclohexyloxymethyl group (—$CH_2$—O—$C_6H_{10}$—($CH_2$)$_{14}CH_3$), in which the double bonds in the long chain portion and the aromatic ring have been hydrogenated.

Meanwhile, examples of $R^{LO}$ include an aryl group such as a phenyl group and a tolyl group; and an aralkyl group such as a benzyl group and a phenylethyl group. That is, examples of the carboxylic acid corresponding to the second acyl group include benzoic acid; methyl-substituted benzoic acids such as o-methylbenzoic acid, m-methylbenzoic acid and p-methylbenzoic acid; and aromatic carboxylic acids such as phenylacetic acid, p-methylphenylacetic acid, 3-phenylpropionic acid, p-methylphenylpropionic acid and cinnamic acid.

From the viewpoint of environment-friendliness, the cellulose, the first carboxylic acid ($R^{SH}COOH$: a short-chain carboxylic acid) corresponding to the first acyl group (—$COR^{SH}$: a short-chain acyl group) and the second carboxylic acid ($R^{LO}COOH$) corresponding to the second acyl group (—$COR^{LO}$) which constitute a cellulose derivative produced by the method for production according to an exemplary embodiment of the present invention are preferably each derived from a natural source such as a plant or each prepared by using an organic compound derived from a natural source such as a plant as the raw material.

For example, a monocarboxylic acid prepared by using cardanol or a cardanol derivative extracted from a cashew nut shell as the raw material can be suitably utilized as the second carboxylic acid ($R^{LO}COOH$) corresponding to the second acyl group (—$COR^{LO}$). For example, a hydrogenated cardanoxyacetic acid (3-pentadecylphenoxyacetic acid) prepared by using a hydrogenated cardanol (m-n-pentadecylphenol (or 3-pentadecylphenol): HO—$C_6H_4$—($CH_2$)$_{14}CH_3$), in which the double bonds in the long chain portion have been hydrogenated and the benzene ring has not been hydrogenated, as the raw material can be suitably utilized as the second carboxylic acid ($R^{LO}COOH$) corresponding to the second acyl group (—$COR^{LO}$). Alternatively, a hydrogenated cardanoxyacetic acid (3-pentadecyl-cyclohexyloxyacetic acid) prepared by using a hydrogenated cardanol (3-pentadecylcyclohexanol: HO—$C_6H_{10}$—($CH_2$)$_{14}CH_3$), in which the double bonds in the long chain portion and the benzene ring have been hydrogenated, as the raw material can be suitably utilized as the second carboxylic acid ($R^{LO}COOH$).

A cellulose derivative produced by the method for production according to an exemplary embodiment of the present invention can contain as the second acyl group an acyl group corresponding to a monocarboxylic acid other than monocarboxylic acids prepared by using cardanol or a cardanol derivative (a cardanol derivative having a benzene ring derived from cardanol) as the raw material. That is, in this cellulose derivative, the first acyl group and the second acyl group are introduced at at least some of hydroxy groups contained in cellulose, and the first acyl group and the second acyl group are an aliphatic acyl group having 2 to 4 carbon atoms and an acyl group represented by the following formula (B), respectively:

$$-CO-CH_2-OR \quad (B)$$

wherein —OR represents an organic group having 1 to 24 carbon atom(s) other than a cardanoxy group. This cellulose derivative can be efficiently produced by the method for production according to an exemplary embodiment of the present invention, and can have improved properties (e.g., thermoplasticity and shock resistance) depending on the structure and the amount of the first and second acyl groups to be introduced. Further, the second acyl group is preferably an organic group having no aromatic ring from the viewpoint of the coloring or hue of a resin to be obtained. Accordingly, from the viewpoint of the coloring or hue of a resin to be obtained, R in the formula is preferably an aliphatic hydrocarbon group having 1 to 24 carbon atom(s), and more preferably an aliphatic saturated hydrocarbon. The first acyl group (an aliphatic acyl group having 2 to 4 carbon atoms) is, as with the above-described first acyl group (—COR$^{SH}$), preferably an acetyl group or a propionyl group, and particularly preferably an acetyl group.

In the description of the above formula (B), "cardanoxy group" means a group containing a benzene ring derived from cardanol, and hence cardanoxy groups represented by the following formulae:

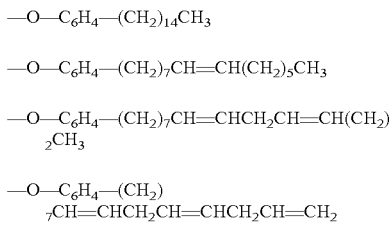

(wherein, in each case, the hydrocarbon group bonding to the benzene ring is bonding to the benzene ring at position 3) are excluded from examples of —OR in the above formula (B). —OR in the above formula (B) can contain a 3-pentadecylcyclohexyloxy group (—O—C$_6$H$_{10}$—(CH$_2$)$_{14}$CH$_3$), which is a cardanoxy group in which the double bonds in both of the long chain portion and the benzene ring derived from cardanol have been hydrogenated.

In a cellulose derivative produced by the method for production according to an exemplary embodiment of the present invention, the number of the second acyl groups (—COR$^{LO}$ e.g., a long-chain acyl group) per glucose unit (three hydroxy groups) in cellulose (degree of substitution with the second acyl group: DS$_{LO}$) (average value), that is, the number of hydroxy groups replaced with the second acyl group per glucose unit (degree of substitution at hydroxy group) (average value) is preferably 0.1 or more, more preferably 0.2 or more, and still more preferably 0.4 or more in view of obtaining a sufficient effect of the introduction. In view of introducing a desired amount of the first acyl group, production efficiency or the like, DS$_{LO}$ is preferably 2.9 or less, and more preferably 1.5 or less. The degree of substitution with the second acyl group (DS$_{LO}$) corresponds to the ratio of the number of the second acyl groups bonded to cellulose relative to the cellulose in terms of glucose unit in the cellulose.

In a cellulose derivative produced by the method for production according to an exemplary embodiment of the present invention, the total of DS$_{SH}$ and DS$_{LO}$ (DS$_{SH}$+DS$_{LO}$) is preferably in the range of (DS$_{SH}$+DS$_{LO}$)≥2 in order to effectively inhibit the formation of an intermolecular (interchain) hydrogen bond by hydroxy groups (—OH) in the cellulose derivative. In addition, in a cellulose derivative to be made, the total of the degrees of substitution (DS$_{SH}$+DS$_{LO}$) is more preferably in the range of (DS$_{SH}$+DS$_{LO}$)≥2.3, still more preferably in the range of (DS$_{SH}$+DS$_{LO}$)≥2.4, and particularly preferably in the range of (DS$_{SH}$+DS$_{LO}$)≥2.5 from the viewpoint of inhibiting the formation of an intramolecular (intrachain) hydrogen bond by hydroxy groups (—OH) in the molecule.

The characteristics (physical properties) of a cellulose derivative to be made also depend on the ratio of DS$_{SH}$ to DS$_{LO}$ (DS$_{LO}$/DS$_{SH}$) in addition to the total degree of substitution (DS$_{SH}$+DS$_{LO}$). In other words, it is necessary to appropriately select the total degree of substitution (DS$_{SH}$+DS$_{LO}$) and the ratio of degrees of substitution (DS$_{LO}$/DS$_{SH}$) depending on characteristics (physical properties) required for a cellulose derivative to be made. In the selection, it is desirable to appropriately select the total degree of substitution (DS$_{SH}$+DS$_{LO}$) and the ratio of the degrees of substitution (DS$_{LO}$/DS$_{SH}$) under conditions that the number of substitution with the second acyl group (such as a long-chain acyl group) per glucose unit in a cellulose derivative to be made (DS$_{LO}$) (average value) is in the range of 0.1 to 2.9, and preferably in the range of 0.1 to 1.5.

In the case that a long-chain acyl group is introduced as the second acyl group (—COR$^{LO}$) in a cellulose derivative prepared by the method for production according to an exemplary embodiment of the present invention, a long-chain hydrocarbon group possessed by the monovalent group R$^{LO}$ constituting the long-chain acyl group can be utilized to modify physical properties such as fluidity and thermoplasticity. Accordingly, the long-chain hydrocarbon group possessed by the monovalent group R$^{LO}$ preferably has the number of carbon atoms more than that of the monovalent group R$^{SH}$ in a short-chain acyl group (—COR$^{SH}$), which is the first acyl group, by two or more, more preferably by three or more, and still more preferably five or more.

In a cellulose derivative prepared by the method for production according to an exemplary embodiment of the present invention, one type of the second acyl group (—COR$^{LO}$: e.g., a long-chain acyl group) is usually introduced; however, two or more types thereof may optionally be introduced. In the case that multiple types of the second acyl groups are introduced, the ratio of the amounts of the respective second acyl groups to be introduced is determined depending on the reactivities of the mixed acid anhydrides (R$^{SH}$—CO—O—CO—R$^{LO}$) as supply sources for the respective second acyl groups and the concentrations of the respective mixed acid anhydrides contained in the reaction solution. Accordingly, considering the reactivities of the mixed acid anhydrides (R$^{SH}$—CO—O—CO—R$^{LO}$) as supply sources for the respective second acyl groups and the reactivity of the acid anhydride ((R$^{SH}$CO)$_2$O) derived from a short-chain carboxylic acid (R$^{SH}$COOH) as a supply source for the first acyl group (a short-chain acyl group), the amounts of the respective second acyl groups (—COR$^{LO}$) to be introduced and the amount of the first acyl group (a short-chain acyl group: —COR$^{SH}$) to be introduced can be regulated to achieve a desired ratio by selecting the concentrations of the respective mixed acid anhydride (R$^{SH}$—CO—O—CO—R$^{LO}$) contained in the reaction solution and the concentration of the acid anhydride ((R$^{SH}$CO)$_2$O) derived from a short-chain carboxylic acid (R$^{SH}$COOH).

In the method for production according to an exemplary embodiment of the present invention, the mixed acid anhydride (R$^{SH}$—CO—O—CO—R$^{LO}$) to be utilized for the acylation reaction can be prepared through the following reaction by using, for example, the second carboxylic acid ($R^{LO}COOH$: e.g., a long-chain carboxylic acid) or an alkali metal salt of the second carboxylic acid (such as $R^{LO}COONa$: e.g., a long-chain carboxylic acid sodium salt) and an acid chloride ($R^{SH}CO$—Cl) derived from the first carboxylic acid ($R^{SH}COOH$: a short-chain carboxylic acid).

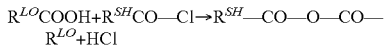

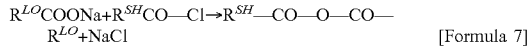 [Formula 7]

Alternatively, the mixed acid anhydride ($R^{SH}$—CO—O—CO—$R^{LO}$) to be utilized for the acylation reaction can be prepared through the following reaction by using the second carboxylic acid ($R^{LO}COOH$) and an acid anhydride (($R^{SH}CO)_2O$) derived from the first carboxylic acid ($R^{SH}COOH$).

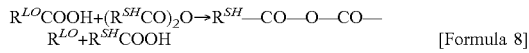 [Formula 8]

In addition to the above reaction, the second carboxylic acid ($R^{LO}COOH$) and the mixed acid anhydride generated ($R^{SH}$—CO—O—CO—$R^{LO}$) reacts to form an acid anhydride (($R^{LO}CO)_2O$) of the second carboxylic acid ($R^{LO}COOH$) through the following reaction.

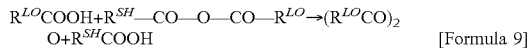 [Formula 9]

Thus, the generation reaction of the above two types of acid anhydrides progresses, and as the result, the reaction mixture to be obtained contains the mixed acid anhydride ($R^{SH}$—CO—O—CO—$R^{LO}$), the acid anhydride (($R^{LO}CO)_2O$) of the second carboxylic acid, the first carboxylic acid ($R^{SH}COOH$), which is a by-product of the reaction, and the second carboxylic acid ($R^{LO}COOH$) and the acid anhydride (($R^{SH}CO)_2O$) of the first carboxylic acid, which are residual raw materials. These components in the reaction mixture are in an equilibrium state, and each of the concentrations of the mixed acid anhydride ($R^{SH}$—CO—O—CO—$R^{LO}$), the anhydride (($R^{LO}CO)_2O$) of the second carboxylic acid, the first carboxylic acid ($R^{SH}COOH$), the second carboxylic acid ($R^{LO}COOH$) and the acid anhydride (($R^{SH}CO)_2O$) of the first carboxylic acid in the reaction mixture to be obtained is determined depending on the concentration of the second carboxylic acid ($R^{LO}COOH$) as the starting raw material at the beginning of the reaction and the concentration of the acid anhydride (($R^{SH}CO)_2O$) of the first carboxylic acid as the starting raw material at the beginning of the reaction. In the method for production according to an exemplary embodiment of the present invention, the above reaction mixture can be utilized as a supply source for the second acyl group (—$COR^{LO}$) and a supply source for the first acyl group (—$COR^{SH}$) in the acylation reaction. The ratio of the amount of the first acyl group (—$COR^{SH}$) to be introduced to the amount of the second acyl group (—$COR^{LO}$) to be introduced can be controlled by adjusting the ratio of the total of the concentration of the mixed acid anhydride ($R^{SH}$—CO—O—CO—$R^{LO}$) and the concentration of the acid anhydride (($R^{LO}CO)_2O$) of the second carboxylic acid to the concentration of the acid anhydride (($R^{SH}CO)_2O$) of the first carboxylic acid.

Alternatively, a separately-prepared mixture in which the mixed acid anhydride ($R^{SH}$—CO—O—CO—$R^{LO}$), the acid anhydride (($R^{LO}CO)_2O$) of the second carboxylic acid and the acid anhydride (($R^{SH}CO)_2O$) of the first carboxylic acid are mixed together in a predetermined concentration ratio can be utilized as a supply source for the second acyl group (—$COR^{LO}$) and the first acyl group (—$COR^{SH}$).

The properties of a cellulose derivative to be made can be modified; for example, water resistance or thermoplasticity can be improved by controlling the ratio of the amounts of the second acyl group (—$COR^{LO}$) and the first acyl group (—$COR^{SH}$) to be introduced into cellulose in the acylation reaction and controlling the total of the amounts of the second acyl group (—$COR^{LO}$) and the first acyl group (—$COR^{SH}$) to be introduced into cellulose in the acylation reaction.

[Solvent]

In the method for production according to an exemplary embodiment of the present invention, the acylation reaction is preferably performed in a solvent having a high electron pair-donating property. This enables to efficiently introduce the first acyl group (—$COR^{SH}$: a short-chain acyl group) and the second acyl group (—$COR^{LO}$: e.g., a long-chain acyl group) at hydroxy groups in cellulose.

A solvent having a high electron pair-donating property has a high hydrogen bond-receptive ability, and therefore can activate hydrogen bonds abundantly present in cellulose to some extent, which promotes the reaction.

The solvent to be used for the method for production is preferably an aprotic organic solvent which exhibits no reactivity against the acid anhydride to be used in the acylation reaction and can dissolve the acid anhydride to be used in the acylation reaction therein.

For example, in the case that cellulose has been pre-treated (activation treatment) with acetic acid, an acetic acid molecule is adsorbed on a hydroxy group in the cellulose via a hydrogen bond. This acetic acid molecule forms a hydrogen bond with the solvent having a high electron donating property, for example, pyridine to form an acetic acid-pyridine complex, and as the result, the acetic acid molecule is eliminated from the hydroxy group in the cellulose. The hydroxy group from which the acetic acid molecule has been eliminated is susceptible to the acylation reaction compared to a hydroxy group on which an acetic acid molecule is adsorbed.

In addition, when the acylation reaction is performed, the mixed acid anhydride ($R^{SH}$—CO—O—CO—$R^{LO}$) and the acid anhydride (($R^{SH}CO)_2O$) of a short-chain carboxylic acid are consumed to form the short-chain carboxylic acid ($R^{SH}$—COOH) as the by-product. By utilizing an organic solvent having a high electron pair-donating property, for example, pyridine, this short-chain carboxylic acid ($R^{SH}$—COOH) as the by-product can be converted to a short-chain carboxylic acid ($R^{SH}$—COOH)-pyridine complex to thereby avoid the elevation of the concentration of the short-chain carboxylic acid ($R^{SH}$—COOH) in the reaction liquid.

Meanwhile, in a mixture containing a mixed acid anhydride ($R^{SH}$—CO—O—CO—$R^{LO}$) prepared by using the second carboxylic acid ($R^{LO}COOH$) such as a long-chain carboxylic acid and an acid anhydride (($R^{SH}CO)_2O$) derived from a short-chain carboxylic acid ($R^{SH}COOH$) as the first carboxylic acid, the residual second carboxylic acid ($R^{LO}COOH$) and a short-chain carboxylic acid ($R^{SH}$—COOH) as the by-product are contained. By utilizing an organic solvent having a high electron pair-donating property, for example, pyridine, the second carboxylic acid ($R^{LO}COOH$) and the short-chain carboxylic acid ($R^{SH}$—COOH) contained in the mixture can be converted in advance to a short-chain carboxylic acid ($R^{SH}$—COOH)-pyridine complex and a second carboxylic acid ($R^{LO}COOH$)-pyridine complex, respectively.

As the solvent having a high electron pair-donating property, an organic solvent having a donor number (Dn), which is a measure of an electron pair-donating property, of 10 or more is preferably used, more preferably an organic solvent having a donor number of 13 or more is used, and particularly preferably an organic solvent having a donor number of 21 or more is used.

Examples of the organic solvent having Dn of 21 or more include trimethyl phosphate (TMP: $(CH_3O)_3P=O$) (Dn=23.0), tributyl phosphate (TBP: $(CH_3(CH_2)_3O)_3P=O$) (Dn=23.7), N,N-dimethylformamide (DMF) (Dn=26.6), N-methyl-2-pyrrolidinone (NMP) (Dn=27.3), dimethylethyleneurea (DMI: 1,3-dimethyl-2-imidazolinone), N,N-dimethylacetamide (DMAc) (Dn=27.8), tetramethylurea (TMU) (Dn=29.6), dimethylsulfoxide (DMSO) (Dn=29.8), N,N-diethylformamide (DEF) (Dn=30.9), N,N-diethylacetamide (DEAc) (Dn=32.1), pyridine (Dn=33.1), hexamethylphosphoric triamide (HMPA) (Dn=38.8) and triethylamine (Dn=61).

Examples of the organic solvent having Dn of 13 or more and less than 21 include acetonitrile (Dn=14.1), sulfolane (Dn=14.8), dioxane (Dn=14.8), propylene carbonate (Dn=15.1), isobutyronitrile (Dn=15.4), diethyl carbonate (Dn=16.0), propiononitrile (Dn=16.1), ethylene carbonate (Dn=16.4), methyl acetate (Dn=16.5), n-butyronitrile (Dn=16.6), t-butyl methyl ketone (Dn=17.0), acetone (Dn=17.0), ethyl acetate (Dn=17.1), methyl isopropyl ketone (MIBK) (Dn=17.1), methyl ethyl ketone (MEK) (Dn=17.4), diethyl ether (Dn=19.2), 1,2-dimethoxyethane (Dn=20) and tetrahydrofuran (THF) (Dn=20.0).

Examples of the organic solvent having Dn of 10 or more and less than 13 include acetic anhydride (Dn=10.5) and benzonitrile (Dn=11.9).

[Base Catalyst]

In the method for producing a cellulose derivative according to an exemplary embodiment of the present invention, the acylation reaction (esterification reaction) can be promoted by performing the reaction in the presence of a base catalyst, which enables to efficiently introduce the first acyl group (—$COR^{SH}$: a short-chain acyl group) and the second acyl group (—$COR^{LO}$: e.g., a long-chain acyl group) at hydroxy groups in cellulose. A base catalyst acts on the hydrogen atom in a hydroxy group to induce polarization to this hydroxy group, and hence the acylation reaction is promoted. For example, when N,N-dimethyl-4-aminopyridine (DMAP) is employed as a base catalyst, the acylation reaction is promoted through the reaction mechanism illustrated below.

[Formula 10]

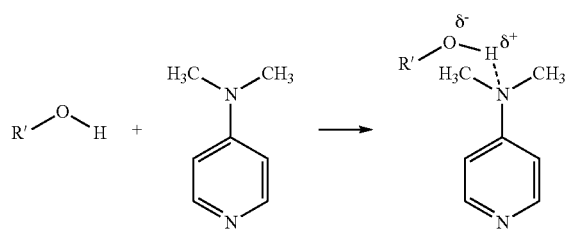

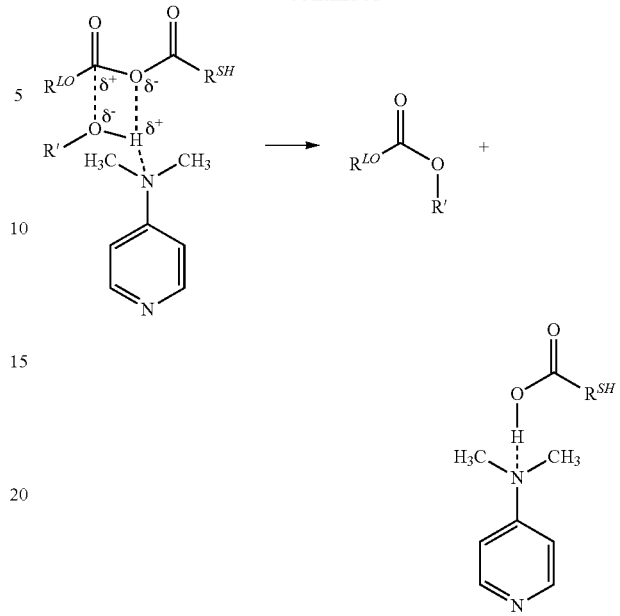

As the above base catalyst, a nitrogen-containing basic organic compound having a tertiary amine structure is preferably used, that is, a basic organic compound containing a nitrogen atom constituting a tertiary amine structure is preferably used. Examples of such a base catalyst include amine-based compounds (such as trimethylamine, triethylamine, N,N-diisopropylethylamine, quinuclidine, 1,4-ethylenepiperazine (DABCO), tetramethylethylenediamine), pyridine-based compounds (such as dimethylaminopyridine (DMAP: N,N-dimethyl-4-aminopyridine) and 4-pyrrolidinopyridine), imidazole-based compounds (such as 1-methylimidazole and 1,2-dimethylimidazole), amidine-based compounds (such as diazabicycloundecene (DBU) and diazabicyclocyclononene (DBN)). From the viewpoint of the improvement of reactivity, DABCO, DMAP and DBU are preferred, and DMAP is particularly preferred.

Among the above base catalysts, there exists a base catalyst corresponding to the organic solvent having Dn of 21 or more. In the case that the organic solvent having Dn of 21 or more is also available for the base catalyst to be utilized for promoting the above acylation reaction, an effect due to the use of a "base catalyst" is also exerted in addition to an effect due to the use of an "organic solvent having Dn of 21 or more".

[Residual Amount of Hydroxy Group in Cellulose Derivative to be Produced]

As the amount of hydroxy group in a cellulose derivative to be produced is larger, the maximum strength and the heat resistance of the cellulose derivative tend to be higher, while the water absorbability tends to be higher. As the conversion rate (degree of substitution) of the hydroxy groups is larger, the water absorbability tends to be lower and the plasticity and the rupture strain tend to be increased, while the maximum strength and the heat resistance tend to be lowered. Considering these tendencies and the amounts of the first acyl group (—$COR^{SH}$: a short-chain organic group) and the second acyl group (—$COR^{LO}$: e.g., a long-chain organic group) to be introduced, the conversion rate of the hydroxy groups can be appropriately set.

The number of residual hydroxy groups per glucose unit in a cellulose derivative to be produced (level of residual hydroxy group: $DS_{OH}$) (average value) can be set to 0 to 2.8. Considering the amounts of the first acyl group and the second acyl group to be introduced (total degree of substitution: $DS_{SH}+DS_{LO}$), $DS_{OH}$ is preferably 0.7 or less, and more preferably 0.5 or less. Some of the hydroxy groups may be remaining, and for example, $DS_{OH}$ can be set to 0.01 or more, and even 0.1 or more. The level of residual hydroxy group ($DS_{OH}$) corresponds to the ratio of the number of residual hydroxy groups relative to the cellulose derivative in terms of glucose unit in the cellulose derivative.

It is to be noted that, in a cellulose derivative to be produced, the total ($DS_{OH}+DS_{SH}+DS_{LO}$) of the level of residual hydroxy group ($DS_{OH}$) (average value), the degree of substitution with the first acyl group (—$COR^{SH}$) ($DS_{SH}$) (average value) and the degree of substitution with the second acyl group (—$COR^{LO}$) ($DS_{LO}$) (average value) is 3 (($DS_{LO}+DS_{SH}+DS_{OH}$)=3).

As a large number of intermolecular (interchain) and intramolecular (intrachain) hydrogen bonds are formed by residual hydroxy groups in a cellulose derivative to be produced, the maximum strength and the heat resistance of the cellulose derivative tend to be increased. In contrast, as the level of residual hydroxy group ($DS_{OH}$) (average value) is lower, the formation of the intramolecular (intrachain) and intermolecular (interchain) hydrogen bonds in the cellulose derivative is inhibited, and as the result, the maximum strength and the heat resistance of the cellulose derivative tend to be lowered. In addition, the plasticity and the rapture strain tend to be increased.

In a cellulose derivative to be produced, as the level of residual hydroxy group ($DS_{OH}$) (average value) is increased, the number of water molecules to hydrogen-bond to residual hydroxy groups to be adsorbed thereon is also increased, and hence the water absorbability tends to be increased. In contrast, as the conversion rate (degree of substitution) of the hydroxy groups, that is, the total ($DS_{SH}+DS_{LO}$) of the degree of substitution with the first acyl group (—$COR^{SH}$) ($DS_{SH}$) (average value) and the degree of substitution with the second acyl group ($DS_{LO}$) (average value) is larger, the number of residual hydroxy groups (level of residual hydroxy group, $DS_{OH}$) (average value) is lower (($DS_{OH}$=3−($DS_{LO}+DS_{SH}$)). As the result, the number of water molecules to hydrogen-bond to residual hydroxy groups to be adsorbed thereon is also decreased, and hence the water absorbability tends to be lowered.

[Production Process]

Hereinafter will be described a process for producing a cellulose derivative of interest from cellulose as the starting raw material in the method for producing a cellulose derivative according to an exemplary embodiment of the present invention.

(Activation Step for Cellulose)

In the method for producing a cellulose derivative according to an exemplary embodiment of the present invention, as the starting raw material, a short-fiber cellulose can be used which are commonly obtained by refining cotton (e.g., cotton linter) or pulp (e.g., wood pulp). This short-fiber cellulose is usually adsorbing moisture, and it is preferred to perform a pre-treatment step to remove the moisture being adsorbed prior to a reaction step to introduce the first acyl group (—$OCR^{SH}$: a short-chain acyl group) and the second acyl group (—$OCR^{LO}$: e.g., a long-chain acyl group) through the acylation reaction. As the result of removing the water ($H_2O$) being adsorbed in the pre-treatment step, hydrolysis reaction of an acid anhydride (such as the mixed acid anhydride ($R^{SH}$—CO—O—CO—$R^{LO}$), the acid anhydride (($R^{SH}$CO)$_2$O) derived from the first carboxylic acid ($R^{SH}$COOH)) to be used in the acylation reaction is inhibited, and therefore the reduction of reactivity due to consumption of the acid anhydride caused by the water being adsorbed is avoided.

Further, by performing an activation step to contact an "activation solvent" with cellulose as the raw material, the dissociation of intramolecular (intrachain) and intermolecular (interchain) hydrogen bonds in the cellulose caused by hydroxy groups in the cellulose can be promoted. This enables to enhance the reactivity of the cellulose.

For example, in the case that acetic acid ($CH_3COOH$) is used as the activation solvent, the dissociation of the hydrogen bond between the oxygen atom of the hydroxy group at position 6 and the hydrogen atom of the hydroxy group at position 2 or the dissociation of the hydrogen bond between the oxygen atom of the hydroxy group at position 3 and the hydrogen atom of the hydroxy group at position 6 in an adjacent cellulose molecule is promoted through the following mechanism.

[Formula 11]

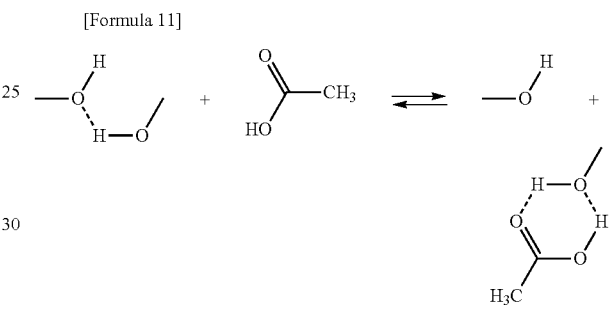

In addition, the water ($H_2O$) being adsorbed on a hydroxy group is removed through the following mechanism. When cellulose in a state that water is adsorbed on a hydroxy group in the cellulose through a hydrogen bond is contacted with the activation solvent, the hydrogen-bonded complex structure constituted of the hydroxy group and the water being adsorbed thereon dissociates, and the detached water molecule becomes in a state of being solvated by an activation solvent molecule. On the other hand, the hydroxy group from which the water molecule has been dissociated and an activation solvent molecule form a complex structure, and thereby the readsorption of a water molecule on a hydroxy group is prevented.

[Formula 12]

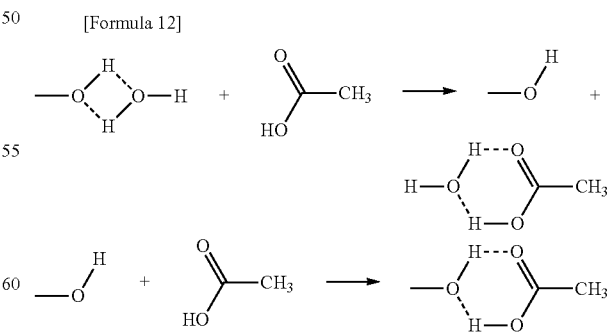

Although the dissociation of a hydrogen-bonded complex structure formed between two hydroxy groups (—OH) is promoted in the cellulose, it is difficult to dissociate all of the hydrogen-bonded complex structures, and therefore the cellulose does not dissolve in the activation solvent. That is, when an aggregate (powder) of a short-fiber cellulose is soaked in the activation solvent, the swelling of the aggregate (powder) is progressed by the activation solvent, but the aggregate (powder) form is maintained because the hydrogen-bonded complex structures are partially retained.

The activation treatment step for the purpose of removing water ($H_2O$) in cellulose and swelling an aggregate (powder) by utilizing the activation solvent can be performed by using a wet process by employing a method in which a powder cellulose is soaked in the activation solvent (soaking method), a method in which the activation solvent is sprayed on a powder cellulose or the like to contact the cellulose with the activation solvent.

Performing the activation treatment step as described above allows various compounds such as the solvent, the base catalyst and the acid anhydride contained in the reaction solution, which are utilized in performing the subsequent acylation reaction, to easily enter into a space between cellulose molecule chains within the swelled aggregate (powder). As the result, the efficiency of the acylation reaction of cellulose is enhanced.

To the above activation treatment step can be applied treatment conditions of common activation treatments applied for cellulose as the raw material, in performing acetylation of cellulose by utilizing acetic anhydride (($CH_3CO)_2O$).

As the activation solvent to be used in the activation treatment step as described above, a hydrophilic organic solvent, which has a high affinity for a hydroxy group present in the glucose unit constituting cellulose and is excellent in an ability to dissolve water therein, is preferably used. Alternatively, water and a hydrophilic organic solvent can also be used as the activation solvent to perform the activation treatment.

Examples of such a hydrophilic organic solvent include water-miscible monocarboxylic acids such as acetic acid, propionic acid, butyric acid, valeric acid, caproic acid, enantoic acid, caprylic acid and pelargonic acid; water-miscible alcohols such as methanol, ethanol, 1-propanol and 2-propanol; water-miscible nitrogen-containing organic compounds such as dimethylformamide, formamide and ethanolamine; and water-miscible sulfoxide compounds such as dimethylsulfoxide. Two or more of these can also be used in combination.

An activation treatment with water and acetic acid, an activation treatment with acetic acid or an activation treatment with dimethylsulfoxide is preferably used, and an activation treatment with water and acetic acid is more preferably used. Specifically, a powder cellulose is dispersed in water to swell with moisture, followed by separating excessive moisture, and thereafter the resultant can be dispersed in acetic acid so as to replace water molecules ($H_2O$) in the cellulose with acetic acid molecules ($CH_3COOH$) and dissociate a part of the hydrogen-bonded complex structures in the cellulose. In the case that dimethylsulfoxide is used, cellulose can be dissolved in dimethylsulfoxide without being swelled with moisture, so as to replace water molecules ($H_2O$) contained in the cellulose with dimethylsulfoxide molecules (($CH_3)_2SO$) and dissociate a part of the hydrogen-bonded complex structures in the cellulose. The activation treatment with dimethylsulfoxide as the activation solvent tends to improve the amount of long-chain acyl group to be introduced. On the other hand, when acetic acid used as the activation solvent is the same component as a by-product of the acylation reaction (acetic acid derived from the acid anhydride), the activation treatment with acetic acid as the activation solvent is advantageous from the viewpoint of purification of a product of interest and recovery of raw materials because the number of components in the reaction system is not increased.

The amount of the activation solvent to be used can be set, for example, to 10 parts by mass or more, preferably 20 parts by mass or more, and more preferably 30 parts by mass or more based on 100 parts by mass of cellulose. The amount of the activation solvent to be used in soaking cellulose in the activation solvent can be set to, for example, 1 or more, preferably 5 or more, and more preferably 10 or more in a mass ratio to cellulose (amount of activation solvent/amount of cellulose). In view of efforts for removing the activation solvent after the activation treatment and reduction of material costs, the amount of the activation solvent to be used is preferably 300 or less, more preferably 100 or less, and still more preferably 50 or less in a mass ratio to cellulose (amount of activation solvent/amount of cellulose).

The temperature in the activation treatment can be appropriately set, for example, in the range of 0 to 100° C. From the viewpoint of the efficiency of the activation and reduction of energy costs required for temperature maintenance, the temperature is preferably set in the range of 10 to 40° C., and more preferably in the range of 15 to 35° C.

The duration for the activation treatment can be appropriately set, for example, in the range of 0.1 to 72 hours. From the viewpoint of obtaining a sufficient effect of the activation and shortening treatment time, the duration is preferably set in the range of 0.1 to 24 hours, and more preferably in the range of 0.5 to 3 hours.

After the activation treatment, an excess of the activation solvent can be removed by using a solid-liquid separation method such as suction filtration.

In the case that the activation solvent remains in the cellulose after the activation treatment and reacts with a component such as the acid anhydride to be used for the subsequent acylation reaction to inhibit the acylation reaction, it is preferred to replace the activation solvent remaining in the cellulose with the solvent to be used in the subsequent acylation reaction. For example, the replacement treatment of the activation solvent with the reaction solvent can be achieved by soaking the cellulose after the activation treatment with the solvent to be used in the subsequent acylation reaction according to the above soaking method of the activation treatment. For example, when the cellulose after the activation treatment is soaked in the reaction solvent to be used in the acylation reaction, due to the reaction solvent entering into the cellulose, the activation solvent remaining in the cellulose is detached and extracted into the reaction solvent. As the result, the cellulose is swelled with the reaction solvent to be in a state that no activation solvent is contained. After this replacement treatment, the reaction solvent which has extracted the activation solvent can be removed by using a solid-liquid separation method such as suction filtration.

(Step of Introducing First Acyl Group and Second Acyl Group)

Preferably after cellulose as the starting raw material is subjected to the above activation treatment, an acylation reaction is performed by using a reaction solution containing the above-described mixed acid anhydride, the solvent and the base catalyst to introduce the first acyl group ($—OCR^{SH}$: a short-chain acyl group) and the second acyl group ($—OCR^{LO}$: e.g., a long-chain acyl group). In the acylation reaction, heating or stirring can be performed as necessary.

As the solvent, a solvent is preferably used which can dissolve an acid anhydride (acylating agent) such as the mixed acid anhydride and the base catalyst homogeneously, allow the reaction solution to enter into the cellulose and elute the by-product (the first carboxylic acid: a short-chain carboxylic acid) after the acylation reaction and the base catalyst from the cellulose.

The amount of the solvent to be used for the reaction solution is, for example, preferably 1 or more, preferably 5 or more, and more preferably 10 or more in a mass ratio to cellulose (amount of solvent/amount of cellulose) from the viewpoint of progressing the reaction sufficiently, and preferably 300 or less, more preferably 100 or less, and 50 times or less from the viewpoint of efforts for removing the reaction solvent after an acylation reaction, reduction of material costs and the like.

The amount of the base catalyst contained in the reaction solution is preferably in the range of 0.1% by mass or more and 100% by mass or less, more preferably in the range of 1% by mass or more and 80% by mass or less, and still more preferably in the range of 3% by mass or more and 50% by mass or less based on the amount of cellulose from the viewpoint of obtaining a sufficient effect of promoting the acylation reaction.

The temperature of the reaction solution in the acylation reaction (reaction temperature) is preferably 10° C. or higher, more preferably 20° C. or higher, and still more preferably 30° C. or higher from the viewpoint of reaction efficiency and the like, and preferably 200° C. or lower, more preferably 150° C. or lower, and still more preferably 100° C. or lower from the viewpoint of suppression of a decomposition reaction, reduction of energy costs and the like.

Although the reaction duration can be appropriately selected considering the reaction temperature, the reaction duration is preferably 0.5 hours or longer, and more preferably 1 hour or longer from the viewpoint of progressing the reaction sufficiently, and preferably 24 hours or shorter, and more preferably 15 hours or shorter from the viewpoint of making the production process more efficient.

(Step of Recovering Product)

After the acylation reaction of cellulose, in the case that a part of a cellulose derivative produced constitutes a solid phase while the other part is in a state of being dissolved in the reaction solution, the cellulose derivative can be recovered in the following manner.

After the acylation reaction of cellulose, a poor solvent is added to the reaction solution to precipitate the cellulose derivative dissolved in the reaction solution (reprecipitation), and the resultant is then subjected to a common solid-liquid separation to separate/remove the reaction solvent to which the poor solvent has been added. Alternatively, after the acylation reaction, low-boiling point components such as the solvent and the by-product (such as acetic acid) in the reaction solution are removed under a reduced pressure, and to the obtained crude product containing the cellulose derivative is added a poor solvent to wash the crude product. This allows to recover both the cellulose derivative constituting a solid phase and the cellulose derivative dissolved in the reaction solution simultaneously. The latter method, in which a crude product is washed with a poor solvent, can reduce the amount of the poor solvent to be used for recovery.

As another method, after the acylation reaction of cellulose, a part of the cellulose derivative produced constituting a solid phase can be recovered by performing a common solid-liquid separation method to separate/remove the reaction solution. Further, the cellulose derivative dissolved in the reaction solution separated can be recovered by adding a poor solvent to this reaction solution to precipitate (reprecipitation) and the resultant is then subjected to a common solid-liquid separation to separate/remove the reaction solution to which the poor solvent has been added. The cellulose derivative constituting a solid phase after the acylation of cellulose and the cellulose derivative reprecipitated from the reaction solution can be recovered to use in a mixture thereafter.

[Physical Properties of Product (Cellulose Derivative)]

In a cellulose derivative obtained by using the method for production according to an exemplary embodiment of the present invention, the first acyl group ($-COR^{SH}$: a short-chain acyl group) and the second acyl group ($-COR^{LO}$: e.g., a long-chain acyl group) have been introduced by utilizing hydroxy groups in cellulose. Accordingly, the cellulose derivative is reduced in intermolecular (interchain) hydrogen bonds (cross-linking sites) compared to cellulose. In addition, in the case that a long-chain acyl group has been introduced as the second acyl group, this long-chain acyl group acts as an internal plasticizer, which allows the cellulose derivative to exhibit good thermoplasticity. Alternatively, introduction of a highly-hydrophobic acyl group as the second acyl group can further improve water resistance.

Further, in a cellulose derivative obtained by using the method for production according to an exemplary embodiment of the present invention, the number of residual hydroxy groups can be made larger than that of a common cellulose derivative, and thus the cellulose derivative can be obtained in a state that a part of the cellulose crystal remains with some of the intramolecular and intermolecular hydrogen bonds saved. In this case, since the hydrogen-bonded portion has a reinforcing function, the strength and the stiffness are improved compared to those of a common cellulose derivative in which no cellulose crystal remains.

[Resin Composition for Molding and Additive]

To a cellulose derivative obtained by using the method for production according to an exemplary embodiment of the present invention can be added an additive depending on desired properties to obtain a cellulose-based resin composition suitable for a molding material.

To the cellulose-based resin composition according to this exemplary embodiment of the present invention can be applied various additives used for a common thermoplastic resin. For example, addition of a plasticizer can further improve the thermoplasticity of the cellulose-based resin composition and the elongation at rupture of the molded object.

Examples of such a plasticizer include phthalates such as dibutyl phthalate, diaryl phthalates, diethyl phthalate, dimethyl phthalate, di-2-methoxyethyl phthalate, ethyl phthalyl-ethyl glycolate and methyl phthalyl-ethyl glycolate; tartrates such as dibutyl tartrate; adipates such as dioctyl adipate and diisononyl adipate; polyalcohol esters such as triacetin, diacetyl glycerin, tripropionitrile glycerin and glycerin monostearate; phosphates such as triethyl phosphate, triphenyl phosphate and tricresyl phosphate; aliphatic dicarboxylic acid dialkyl ester such as dibutyl adipate, dioctyl adipate, dibutyl azelate, dioctyl azelate and dioctyl sebacate; citrates such as triethyl citrate, acetyl-triethyl citrate and acetyl tributyl citrate; epoxidized vegetable oils such as an epoxidized soybean oil and an epoxidized linseed oil; a castor oil and a derivative thereof; benzoates such as ethyl O-benzoylbenzoate; aliphatic dicarboxylates such as sebacates and azelates; unsaturated dicarboxylates such as maleates; and additionally, N-ethyltoluenesulfonamide, O-cresyl p-toluenesulfonate and tripropionin. Among these, particularly, addition of dioctyl adipate, benzyl-2 butoxyethoxyethyl adipate, tricresyl phosphate, diphenyl cresyl phosphate, diphenyl octyl phosphate or the like as a plasticizer can effectively improve not only the thermoplasticity of the cellulose-based resin composition and the elongation at rupture of the molded object, but also the shock resistance of the molded object.

Examples of other plasticizers include cyclohexanedicarboxylates such as dihexyl cyclohexanedicarboxylate, dioctyl cyclohexanedicarboxylate and di-2-methyloctyl cyclohexanedicarboxylate; trimellitates such as dihexyl trimellitate, diethylhexyl trimellitate and dioctyl trimellitate; pyromellitates such as dihexyl pyromellitate, diethylhexyl pyromellitate and dioctyl pyromellitate.

To the cellulose-based resin composition according to an exemplary embodiment of the present invention can be added as necessary an inorganic or organic granular or fibrous filler. Addition of the filler can further improve the strength and the stiffness.

Examples of such a filler include mineral particles (such as talk, mica, calcined diatomaceous earth, kaolin, sericite, bentonite, smectite, clay, silica, a quartz powder, a glass bead, a glass powder, a glass flake, a milled fiber, wallastonite (or wollastonite)); boron-containing compounds (such as boron nitride, boron carbide and titanium boride); metal carbonates (such as magnesium carbonate, ground calcium carbonate and precipitated calcium carbonate); metal silicates (such as calcium silicate, aluminum silicate, magnesium silicate and magnesium aluminosilicate); metal oxides (such as magnesium oxide); metal hydroxides (such as aluminum hydroxide, calcium hydroxide and magnesium hydroxide); metal sulfates (such as calcium sulfate and barium sulfate); metal carbides (such as silicon carbide, aluminum carbide and titanium carbide); metal nitrides (such as aluminum nitride, silicon nitride and titanium nitride); white carbon; and various metal foils.

Examples of the fibrous filler include organic fibers (such as natural fibers and papers); inorganic fibers (such as a glass fiber, an asbestos fiber, a carbon fiber, a silica fiber, a silica-alumina fiber, wollastonite, a zirconia fiber and a potassium titanate fiber); and metal fibers.

These fillers can be used singly or two or more thereof can be used in combination.

To the cellulose-based resin composition according to an exemplary embodiment of the present invention can be added as necessary a flame retardant. Addition of the flame retardant can impart flame retardance.

Examples of the flame retardant include metal hydrates such as magnesium hydroxide, aluminum hydroxide and hydrotalcite; basic magnesium carbonate, calcium carbonate, silica, alumina, talc, clay, zeolite, bromide-based flame retardants, antimony trioxide, phosphate-based flame retardants (such as aromatic phosphates and aromatic condensed phosphates) and compounds containing phosphorous and nitrogen (phosphazene compounds). These flame retardants can be used single or two or more thereof can be used in combination.

To the cellulose-based resin composition according to an exemplary embodiment of the present invention can be added as necessary a shock resistance improver. Addition of the shock resistance improver can enhance the shock resistance of the molded object.

Examples of the shock resistance improver include rubber components and silicone compounds. Examples of the rubber component include a natural rubber, an epoxidized natural rubber and a synthetic rubber. Examples of the silicone compound include organic polysiloxanes formed through polymerization of an alkyl siloxane, an alkylphenyl siloxane or the like; or modified silicone compounds in which a side chain or a terminal of the organic polysiloxane is modified with a polyether, methylstyryl, an alkyl, a higher fatty acid ester group, an alkoxy group, fluorine, an amino group, an epoxy group, a carboxyl group, a carbinol group, a methacryl group, a mercapto group, a phenol group or the like. These shock resistance improvers can be used singly or two or more thereof can be used in combination.

As the silicone compound, a modified silicone compound (a modified polysiloxane compound) is preferably used. As the modified silicone compound, a modified polydimethylsiloxane is preferably used which has a main chain composed of repeating units of dimethylsiloxane and has a structure in which some of methyl groups in the side chain or the terminal is replaced with an organic group including at least one group selected from an amino group, an epoxy group, a carbinol group, a phenol group, a mercapto group, a carboxyl group, a methacryl group, a long-chain alkyl group, an aralkyl group, a phenyl group, a phenoxy group, an alkylphenoxy group, a long-chain fatty acid ester group, a long-chain fatty acid amide group and a polyether group.

Such an organic substituent possessed by the modified silicone compound improves the affinity for the above-described cellulose derivative to enhance the dispersibility in the cellulose-based resin composition, and hence a molded object excellent in shock resistance can be obtained by using the cellulose-based resin composition.

As such a modified silicone compound, those produced according to a conventional method can be used.

Examples of the above organic substituent contained in the modified silicone compound include those represented by the following formulae (3) to (21).

[Formula 13]

$$—R^1—NH_2 \tag{3}$$

$$—R^2—\overset{H}{N}—R^3—NH_2 \tag{4}$$

[Formula 14]

$$—R^4—\underset{\underset{O}{\diagdown\diagup}}{\overset{H}{C}}—CH_2 \tag{5}$$

$$—R^5—O\diagdown\!\!\!\diagdown\!\!\!\diagup\!\!\!\diagup_O \tag{6}$$

$$—R^6—\text{(cyclohexane with epoxide)} \tag{7}$$

[Formula 15]

$$—R^7—OH \tag{8}$$

$$—R^8—\underset{R^{10}OH}{\overset{R^9—OH}{\underset{|}{C}}}—R^{11} \tag{9}$$

$$—R^{12}—\text{(phenyl)}—OH \tag{10}$$

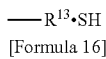
[Formula 16]

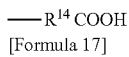
[Formula 17]

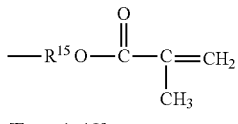
[Formula 18]

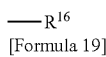
[Formula 19]

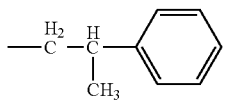

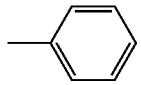

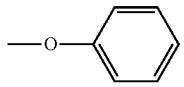

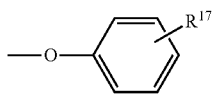
[Formula 20]

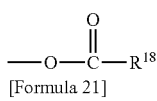
[Formula 21]

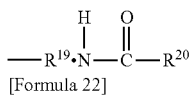
[Formula 22]

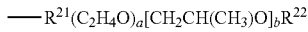

In the above formula, a and b each represent an integer of 1 to 50.

In the above formulae, $R^1$ to $R^{10}$, $R^{12}$ to $R^{15}$, $R^{19}$ and $R^{21}$ each represent a divalent organic group. Examples of the divalent organic group include alkylene groups such as a methylene group, an ethylene group, a propylene group and a butylene group; alkylarylene groups such as a phenylene group and a tolylene group; oxyalkylene groups and polyoxyalkylene groups such as —(CH$_2$—CH$_2$—O)c- (c represents an integer of 1 to 50) and —[CH$_2$—CH(CH$_3$)—O]$_d$— (d represents an integer of 1 to 50); and —(CH$_2$)$_e$—NHCO— (e represents an integer of 1 to 8). Among these, an alkylene group is preferred, and an ethylene group and propylene group are particularly preferred.

In the above formulae, $R^{11}$, $R^{16}$ to $R^{18}$, $R^{20}$ and $R^{22}$ each represent an alkyl group having 20 or less carbon atoms. Examples of the alkyl group include a methyl group, an ethyl group, a propyl group, a butyl group, a pentyl group, a hexyl group, a heptyl group, an octyl group, a nonyl group, a decyl group, an undecyl group, a dodecyl group, a tridecyl group, a tetradecyl group and a pentadecyl group. Further, the above alkyl group may have one or more unsaturated bond(s) in the structure.

It is desirable to set the total average content of organic substituents in the modified silicone compound in such a range that, in producing a cellulose derivative composition, the modified silicone compound can be dispersed in the cellulose derivative in the matrix in an appropriate particle diameter (e.g., 0.1 μm or larger and 100 μm or smaller). When the modified silicone compound is dispersed in the cellulose derivative in an appropriate particle diameter, stress concentration on the periphery of the silicone region, which has a low modulus of elasticity, effectively occurs, and thereby a resin molded object having excellent shock resistance can be obtained. Such a total average content of organic substituents is preferably 0.01% by mass or more, more preferably 0.1% by mass or more, and preferably 70% by mass or less, and more preferably 50% by mass or less.

In the case that an appropriate amount of organic substituent are contained in the modified silicone compound, the affinity for the cellulose-based resin is improved to allow the modified silicone compound to be dispersed in the cellulose-based resin composition in an appropriate particle diameter and further enable to suppress bleed-out due to the separation of the modified silicone compound in a molded article. In the case that the total average content of organic substituents is too low, it is difficult to disperse the modified silicone compound in the cellulose-based resin composition in an appropriate particle diameter.

In the case that the organic substituent in the modified polydimethylsiloxane compound is an amino group, an epoxy group, a carbinol group, a phenol group, a mercapto group, a carboxyl group or a methacryl group, the average content of the organic substituent in this modified polydimethylsiloxane compound can be determined by using the following formula (I).

Average content of organic substituent (%)=(formula weight of organic substituent/equivalent of organic substituent)×100     (I)

In formula (I), the equivalent of an organic substituent is the average value of the mass of the modified silicone compound per 1 mole of the organic substituent.

In the case that the organic substituent in the modified polydimethylsiloxane compound is a phenoxy group, an alkylphenoxy group, a long-chain alkyl group, an aralkyl group, a long-chain fatty acid ester group or a long-chain fatty acid amide group, the average content of the organic substituent in this modified polydimethylsiloxane compound can be determined by using the following formula (II).

Average content of organic substituent (%)=x×w/[(1−x)×74+x×(59+w)]×100     (II)

In formula (II), x is the average value of the mole fraction of the organic substituent-containing siloxane repeating unit to all the siloxane repeating units in the modified polydimethylsiloxane compound, and w is the formula weight of the organic substituent.

In the case that the organic substituent in the modified polydimethylsiloxane compound is a phenyl group, the average content of the phenyl group in this modified polydimethylsiloxane compound can be determined by using the following formula (III).

Average content of phenyl group (%)=154×x/[74×(1−x)+198×x]×100     (III)

In formula (III), x is the average value of the mole fraction of the phenyl group-containing siloxane repeating unit to all the siloxane repeating units in the modified polydimethylsiloxane compound.

In the case that the organic substituent in the modified polydimethylsiloxane compound is a polyether group, the average content of the polyether group in this modified polydimethylsiloxane compound can be determined by using the following formula (IV).

$$\text{Average content of polyether group (\%)} = \text{HLB value}/20 \times 100 \quad \text{(IV)}$$

In formula (IV), the HLB value is a value indicating the degree of affinity of a surfactant for water and oils, and defined as the following formula (V) according to a Griffin method.

$$\text{HLB value} = 20 \times (\text{total formula weight of hydrophilic portions/molecular weight}) \quad \text{(V)}$$

To the cellulose-based resin composition according to an exemplary embodiment may be added two or more modified silicone compounds which are different to each other in affinity for the cellulose derivative as the main component. In this case, the dispersibility of the modified silicone compound having a relatively low affinity (A1) is improved by the modified silicone compound having a relatively high affinity (A2), and thereby a cellulose-based resin composition having still more excellent shock resistance can be obtained. The total average content of organic substituents of the modified silicone compound having a relatively low affinity (A1) is preferably 0.01% by mass or more, and more preferably 0.1% by mass or more, and preferably 15% by mass or less, and more preferably 10% by mass or less. The total average content of organic substituents of the modified silicone compound having a relatively high affinity (A2) is preferably 15% by mass or more, and more preferably 20% by mass or more, and preferably 90% by mass or less.

The formulation ratio (mass ratio) of the modified silicone compound (A1) to the modified silicone compound (A2) can be set in the range of 10/90 to 90/10.

Regarding to the dimethylsiloxane repeating units and the organic substituent-containing siloxane repeating units in the modified silicone compound, the same repeating units may be linked sequentially, or different ones may be linked alternately or randomly. The modified silicone compound may have a branched structure.

The number average molecular weight of the modified silicone compound is preferably 900 or more, more preferably 1000 or more, and preferably 1000000 or less, more preferably 300000 or less, and still more preferably 100000 or less. In the case that the number average molecular weight of the modified silicone compound is sufficiently large, the loss of the modified silicone compound due to volatilization can be suppressed when a melted cellulose derivative and the modified silicone compound are kneaded together in producing the cellulose-based resin composition. Further, in the case that the molecular weight of the modified silicone compound is not too large and moderate, the dispersibility of the modified silicone compound in the cellulose-based resin composition is good, and hence a molded article having a homogeneous composition can be obtained.

As the number average molecular weight of the modified silicone compound, a measurement (calibrated with a standard polystyrene sample) by GPC using 0.1% solution of a sample (modified silicone compound) in chloroform can be employed.

The content of such a modified silicone compound is preferably 1% by mass or more, and more preferably 2% by mass or more based on the whole cellulose-based resin composition in view of obtaining a sufficient effect of the addition. In view of sufficiently ensuring the properties such as strength of the molded object and suppressing bleed-out, the content of the modified silicone compound is preferably 20% by mass or less, and more preferably 10% by mass or less.

Adding such a modified silicone compound to the cellulose-based resin composition enables to disperse the modified silicone compound in the resin composition in an appropriate particle diameter (e.g., 0.1 to 100 μm), and hence the shock resistance of the molded object can be enhanced.

To the cellulose-based resin composition according to an exemplary embodiment may be added as necessary an additive commonly applied to a cellulose-based resin composition such as a colorant, an antioxidant and a heat stabilizer.

To the cellulose-based resin composition according to an exemplary embodiment may be added as necessary a common thermoplastic resin.

Particularly, addition of a thermoplastic resin excellent in flexibility such as a thermoplastic polyurethane elastomer (TPU) can enhance the shock resistance of the molded object. The content of such a thermoplastic resin (particularly, a TPU) is preferably 1% by mass or more, and more preferably 5% by mass or more based on the whole cellulose-based resin composition in view of obtaining a sufficient effect of the addition. In view of ensuring the properties such as strength of the cellulose-based resin and suppressing bleed-out, the content of this thermoplastic resin (particularly, a TPU) is preferably 20% by mass or less, and more preferably 15% by mass or more.

As the thermoplastic polyurethane elastomer (TPU) suitable for enhancing shock resistance, those prepared by using a polyol, a diisocyanate and a chain extender can be used.

Examples of the polyol include a polyester polyol, a polyester ether polyol, polycarbonate polyol and a polyether polyol.

Examples of the above polyester polyol include polyester polyols obtained by dehydration condensation reaction of a polycarboxylic acid such as an aliphatic dicarboxylic acid (such as succinic acid, adipic acid, sebacic acid and azelaic acid), an aromatic dicarboxylic acid (phthalic acid, terephthalic acid, isophthalic acid and naphthalene dicarboxylic acid) and an alicyclic dicarboxylic acid (hexahydrophthalic acid, hexahydroterephthalic acid and hexahydroisophthalic acid) or an acid ester or an acid anhydride thereof, with a polyalcohol such as ethylene glycol, 1,3-propanediol (HO—CH$_2$CH$_2$CH$_2$—OH), 1,2-propylene glycol, 1,3-butanediol, 1,4-butanediol, 1,5-pentanediol, 1,6-hexanediol, 3-methyl-1,5-pentanediol, neopentyl glycol, 1,3-octanediol, 1,9-nonanediol or a mixture thereof; and a polylactonediol obtained by a ring-opening polymerization of a lactone monomer such as ε-caprolactone.

Examples of the above polyester ether polyol include compounds obtained by dehydration condensation reaction of a polycarboxylic acid such as an aliphatic dicarboxylic acid (such as succinic acid, adipic acid, sebacic acid and azelaic acid), an aromatic dicarboxylic acid (phthalic acid, terephthalic acid, isophthalic acid and naphthalene dicarboxylic acid) and an alicyclic dicarboxylic acid (hexahydrophthalic acid, hexahydroterephthalic acid and hexahydroisophthalic acid) or an acid ester or an acid anhydride thereof, with diethylene glycol or a glycol such as an alkylene oxide adduct (such as a propylene oxide adduct) or a mixture thereof.

Examples of the above polycarbonate polyol include polycarbonate polyols obtained by reacting one or two or more polyalcohols such as ethylene glycol, 1,3-propanediol (HO—$CH_2CH_2CH_2$—OH), 1,2-propylene glycol, 1,3-butanediol, 1,4-butanediol, 1,5-pentanediol, 1,6-hexanediol, 3-methyl-1,5-pentanediol, neopentyl glycol, 1,8-octanediol, 1,9-nonanediol and diethylene glycol, with diethylene carbonate, dimethyl carbonate, diethyl carbonate or the like. Alternatively, a copolymer of a polycaprolactone polyol (PCL) and a polyhexamethylene carbonate (PHL) may be used.

Examples of the above polyether polyol include, for example, a polyethylene glycol, a polypropylene glycol and a polytetramethylene ether glycol which are obtained by polymerizing a cyclic ether such as ethylene oxide, propylene oxide and tetrahydrofuran, respectively, and a copolyether thereof.

Examples of the diisocyanate used to form the TPU include tolylene diisocyanate (TDI), 4,4'-diphenylmethane diisocyanate (MDI), 1,5-naphthylene diisocyanate (NDI), tolidine diisocyanate, 1,6-hexamethylene diisocyanate (HDI), isophorone diisocyanate (IPDI), xylylene diisocyanate (XDI), hydrogenated XDI, tetramethylxylene diisocyanate (TMXDI), 1,8-diisocyanate methyloctane and dicyclohexylmethane diisocyanate (hydrogenated MDI; HMDI). Among these, 4,4'-diphenylmethane diisocyanate (MDI) and 1,6-hexamethylene diisocyanate (HDI) can be suitably used.

As the chain extender used to form the TPU, a low-molecular weight polyol can be used. Examples of the low-molecular weight polyol include aliphatic polyols such as ethylene glycol, 1,3-propanediol (HO—$CH_2CH_2CH_2$—OH), 1,2-propylene glycol, 1,3-butanediol, 1,4-butanediol, 1,5-pentanediol, 1,6-hexanediol, 3-methyl-1,5-pentanediol, neopentyl glycol, 1,8-octanediol, 1,9-nonanediol, diethylene glycol, 1,4-cyclohexanedimethanol and glycerin; and aromatic glycols such as 1,4-dimethylolbenzene, bisphenol A and an ethylene oxide or propylene oxide adduct of bisphenol A.

In the case that a silicone compound is copolymerized with the above-illustrated thermoplastic polyurethane elastomer (TPU), a molded object to be prepared from the cellulose-based resin composition with this copolymer added thereto can be provided with further excellent shock resistance.

These thermoplastic polyurethane elastomers (TPUs) may be used singly or in combination.

The method for preparing a cellulose-based resin composition by adding the additives and the thermoplastic resin to the cellulose derivative according to an exemplary embodiment is not particularly limited, and for example, a cellulose-based resin composition can be prepared by melt-blending the additives and the cellulose derivative by using hand-mixing or a compounding machine such as a known mixer, for example, a tumbler mixer, a ribbon blender, a uniaxial or multiaxial mixing extruder, a kneader and a kneading roll, and as necessary performing, for example, granulation into an appropriate shape. Alternatively can be employed another method in which the additives and the cellulose derivative dispersed in a solvent such as an organic solvent are mixed together, and as necessary, a coagulating solvent is added thereto to obtain a mixture composition of the additives and the cellulose derivative, and thereafter the solvent is evaporated to afford a cellulose-based resin composition.

The cellulose derivative according to an exemplary embodiment described above can be used as a base resin for a molding material (resin composition). The molding material using the cellulose derivative as the base resin is suitable for molded objects such as a housing such as an outer package for an electronical device.

Here, "base resin" means a main component in a molding material (resin composition), and that it is acceptable for a base resin to contain other components in such a range that the function of the main component is not inhibited. Although the content fraction of the main component (base resin) is not particularly specified, the exemplary embodiment is intended to encompass the cases that the content fraction of the main component (base resin) is 50% by mass or more, preferably 70% by mass or more, more preferably 80% by mass or more, and particularly preferably 90% by mass or more.

Accordingly, in the cellulose-based resin composition according to the exemplary embodiment of the present invention, the content of the cellulose derivative according to the exemplary embodiment of the present invention can be selected to be in the range of 50% by mass or more, preferably 70% by mass or more, more preferably 80% by mass or more, and particularly preferably 90% by mass or more based on the whole cellulose-based resin composition.

EXAMPLES

Hereinafter, the present invention will be illustrated in more detail by referring to specific examples.

Synthesis Example 1

Synthesis of Long-Chain Carboxylic Acid (Hydrogenated Cardanoxyacetic Acid)

Using hydrogenated cardanol (manufactured by ACROS Organics, m-n-pentadecylphenol) in which the unsaturated bonds in the linear hydrocarbon portion of cardanol have been hydrogenated as a raw material, the phenolic hydroxy group thereof was reacted with monochloroacetic acid to impart a carboxymethyl group, and thereby hydrogenated cardanoxyacetic acid ($CH_3(CH_2)_{14}$—$C_6H_4$—O—$CH_2$—COOH) was obtained. Specifically, the hydrogenated cardanoxyacetic acid was made according to the following procedure.

First, 80 g (0.26 mol) of hydrogenated cardanol was dissolved in 120 mL of methanol, and an aqueous solution of 64 g (1.6 mol) of sodium hydroxide dissolved in 40 mL of distilled water was added thereto.

Subsequently, a solution of 66 g (0.70 mol) of monochloroacetic acid (manufactured by KANTO CHEMICAL CO., INC.) dissolved in 50 mL of methanol was added dropwise at a room temperature. After the dropwise addition was completed, stirring was continued while refluxing at 73° C. for 4 hours. After the reaction solution was cooled to a room temperature, this reaction solution was acidified to pH=1 with dilute hydrochloric acid. Thereafter, 250 mL of methanol and 500 mL of diethyl ether were added thereto, followed by adding 200 mL of distilled water. The aqueous layer was separated and discarded by using a separating funnel, and the ether layer was washed twice with 400 mL of distilled water. Anhydrous magnesium sulfate was added to the ether layer for drying, and thereafter was filtered off. The filtrate (ether layer) was concentrated in an evaporator (90° C./3 mmHg) under a reduced pressure to afford a crude product in a yellowish brown powder as a solid content. The obtained crude product was recrystallized from n-hexane and dried in vacuum.

After the above procedure, 46 g (0.12 mol) of hydrogenated cardanoxyacetic acid ($CH_3(CH_2)_{14}$—$C_6H_4$—O—$CH_2$—COOH) as a white powder was obtained.

Synthesis Example 2

Synthesis of Mixed Acid Anhydride 1 (Hydrogenated Cardanoxyacetic Acid-Acetic Acid Mixed Acid Anhydride)

The hydrogenated cardanoxyacetic acid obtained in Synthesis Example 1 was mixed with acetic anhydride and heated to afford a mixed acid anhydride 1(hydrogenated cardanoxyacetic acid-acetic acid mixed acid anhydride, $CH_3(CH_2)_{14}$—$C_6H_4$—O—$CH_2$—CO—O—CO—$CH_3$). Specifically, the mixed acid anhydride 1 was made according to the following procedure.

While heating, 40.2 g (0.11 mol) of the hydrogenated cardanoxyacetic acid obtained in Synthesis Example 1 and 21.0 ml (0.22 mol) of acetic anhydride were stirred at 100° C. for 1 hour. Thereby, a mixture 1 containing a mixed acid anhydride 1 was obtained.

The obtained mixture 1 was analyzed by using $^1$H-NMR (manufactured by Bruker Corporation, product name: AV-400, 400 MHz). The result showed that the molar ratio of acetic anhydride, the mixed acid anhydride 1, hydrogenated cardanoxyacetic anhydride, hydrogenated cardanoxyacetic acid and acetic acid contained in the mixture 1 was, in this order, 43.0:20.8:2.0:10.0:24.2.

Synthesis Example 3

Synthesis of Mixed Acid Anhydride 2 (Stearic Acid-Acetic Acid Mixed Acid Anhydride)

Stearic acid and acetic anhydride were mixed and heated to afford a mixed acid anhydride 2 (stearic acid-acetic acid mixed acid anhydride, $CH_3(CH_2)_{16}CO$—O—CO—$CH_3$). Specifically, the mixed acid anhydride 2 was made according to the following procedure.

While heating, 31.7 g (0.11 mol) of stearic acid and 21.0 ml (0.22 mol) of acetic anhydride were stirred at 100° C. for 1 hour. Thereby, a mixture 2 containing a mixed acid anhydride 2 was obtained.

The obtained mixture 2 was analyzed by using $^1$H-NMR (manufactured by Bruker Corporation, product name: AV-400, 400 MHz). The result showed that the molar ratio of acetic anhydride, the mixed acid anhydride 2, stearic anhydride, stearic acid and acetic acid contained in the mixture 2 was, in this order, 40.0:23.5:3.0:6.6:26.9.

Example 1

An activation treatment for cellulose was performed, and thereafter the mixed acid anhydride 1 obtained in Synthesis Example 2 was reacted to afford a long-chain/short-chain-bonded cellulose derivative. Specifically, the long-chain/short-chain-bonded cellulose derivative was made according to the following procedure.

First, an activation treatment for cellulose was performed according to the following method.

In 90 mL of pure water was dispersed 6.37 g (weight including 6.23% of adsorbed moisture: the cellulose content was 6.0 g (0.037 mol/glucose unit)) of cellulose (manufactured by NIPPON PAPER Chemicals CO., LTD., product name: KC Flock, grade: W-50GK). This dispersion was stirred for 15 minutes, and the pure water was removed by suction filtration for 5 minutes. The obtained solid content was dispersed in 90 mL of acetic acid, stirred for 15 minutes, and the acetic acid was removed by suction filtration for 5 minutes. The dispersing in/removal of acetic acid was performed twice. Thereby, an activation-treated cellulose was obtained.

Next, a cellulose derivative was synthesized according to the following method.

The above activation-treated cellulose was dispersed in 150 mL of dry pyridine. To this dispersion was added 3.0 g of dimethylaminopyridine (DMAP) and the mixture 1 containing the mixed acid anhydride 1 obtained in Synthesis Example 2, and stirred at 100° C. for 15 hours while heating. Subsequently, 1.5 L of methanol was added to the reaction solution to reprecipitate a solid, which was then filtered off. The solid content filtered off was washed twice with 150 ml of isopropyl alcohol at 60° C., and thereafter dried at 105° C. for 5 hours under vacuum. Thereby, 17.5 g of a long-chain/short-chain-bonded cellulose derivative was obtained.

The degree of substitution with short-chain acyl group ($DS_{SH}$) and the degree of substitution with long-chain acyl group ($DS_{LO}$) of the obtained long-chain/short-chain-bonded cellulose derivative were measured by using IR (manufactured by JASCO Corporation, product name: FT/IR-4100). The measurement result showed that the $DS_{SH}$ was 1.97 and the $DS_{LO}$ was 0.50. Accordingly, from the result based on the IR measurement, the number of residual hydroxy groups per glucose unit (level of residual hydroxy group, $DS_{OH}$) (average value) is estimated to be 0.53 ($DS_{OH}$=0.53).

The $DS_{LO}$ in the above IR measurement was calculated by using the strength of the contraction peak (1586 $cm^{-1}$) derived from the benzene ring backbone. The $DS_{SH}$ in the IR measurement was defined as a value obtained by subtracting the $DS_{LO}$ from the total amount of acyl group introduced (the total degree of substitution: $DS_{SH}+DS_{LO}$) determined by using the strength of the C=O contraction peak (1750 $cm^{-1}$) derived from the ester linkage. These peak strengths were normalized against the strength of the contraction peak (1050 $cm^{-1}$) derived from the ether linkage in the glucopyranose ring. The relationship between the degree of substitution and the peak strength was calibrated by using a reference material (the $DS_{SH}$ and the $DS_{LO}$ thereof can be calculated by using NMR) synthesized from acetylcellulose (2,6-diacetylcellulose) and hydrogenated cardanoxyacetyl chloride.

Here, since the obtained long-chain/short-chain-bonded cellulose derivative was partially soluble in chloroform, the $DS_{SH}$ and the $DS_{LO}$ of the soluble part were measured by using $^1$H-NMR (manufactured by Bruker Corporation, product name: AV-400, 400 MHz), the result of which showed that the $DS_{SH}$ was 2.4 and the $DS_{LO}$ was 0.5.

Evaluation of the obtained cellulose derivative was performed according to the following procedure. The result is shown in Table 1.

[Evaluation of Fluidity]

The melt flow rate (MFR) of the obtained cellulose derivative was measured by using a flow tester (manufactured by Shimadzu Corporation, product name: CFT-500D). The size of the die used, the measuring temperature, the pre-heating duration and the load were set to 10×2 mmϕ, 200° C., 120 seconds and 500 kgf/$cm^2$ (49 MPa), respectively.

[Evaluation of Thermoplasticity (Press Moldability)]

Press molding was performed under the following conditions to obtained a molded object, and the moldability in the press molding was evaluated according to the following criteria.

(Molding Conditions)

temperature: 200° C., duration: 2 minutes, pressure 100 kgf/cm² (9.8 MPa);

size of molded object: thickness: 2 mm, width: 13 mm, length: 80 mm.

(Rating)

○: good, Δ: poor (generation of a void, a sink or a partial unfilled part), x: unmoldable.

[Flexural Test]

A flexural test was performed for the molded object obtained by above molding in accordance with JIS K7171 (flexural strength, modulus of elasticity in flexure).

Example 2

An activation treatment for cellulose was performed, and thereafter the mixed acid anhydride 1 obtained in Synthesis Example 2 was reacted to afford a long-chain/short-chain-bonded cellulose derivative. Specifically, the long-chain/short-chain-bonded cellulose derivative was made according to the following procedure.

The activation treatment for cellulose was performed according to the same procedure as in Example 1.

A long-chain/short-chain-bonded cellulose derivative was made according to the same procedure as in Example 1 except that N-methylpyrrolidinone (NMP) was used in place of dry pyridine as a solvent used in synthesizing a cellulose derivative (acylation). As the result, 17.6 g of a long-chain/short-chain-bonded cellulose derivative was obtained from the starting raw material (the cellulose content was 6.0 g (0.037 mol/glucose unit)).

The degree of substitution with short-chain acyl group ($DS_{SH}$) and the degree of substitution with long-chain acyl group ($DS_{LO}$) of the obtained long-chain/short-chain-bonded cellulose derivative were measured by using IR (manufactured by JASCO Corporation, product name: FT/IR-4100) according to the measuring method described in Example 1. The measurement result showed that the $DS_{SH}$ was 2.02 and the $DS_{LO}$ was 0.53. Accordingly, from the result based on the IR measurement, the number of residual hydroxy groups per glucose unit (level of residual hydroxy group, $DS_{OH}$) (average value) is estimated to be 0.45 ($DS_{OH}$=0.45).

Here, since the obtained long-chain/short-chain-bonded cellulose derivative was partially soluble in chloroform, the $DS_{SH}$ and the $DS_{LO}$ of the soluble part were measured by using ¹H-NMR (manufactured by Bruker Corporation, product name: AV-400, 400 MHz), the result of which showed that the $DS_{SH}$ was 2.4 and the $DS_{LO}$ was 0.6.

The fluidity and the thermoplasticity (press moldability) of the obtained cellulose derivative were evaluated according to the procedure described in Example 1. The result is shown in Table 1.

Example 3

An activation treatment for cellulose was performed, and thereafter the mixed acid anhydride 1 obtained in Synthesis Example 2 was reacted to afford a long-chain/short-chain-bonded cellulose derivative. Specifically, the long-chain/short-chain-bonded cellulose derivative was made according to the following procedure.

The activation treatment for cellulose was performed according to the same procedure as in Example 1.

A long-chain/short-chain-bonded cellulose derivative was made according to the same procedure as in Example 1 except that dimethylformamide (DMF) was used in place of dry pyridine as a solvent used in synthesizing a cellulose derivative (acylation). As the result, 18.1 g of a long-chain/short-chain-bonded cellulose derivative was obtained from the starting raw material (the cellulose content was 6.0 g (0.037 mol/glucose unit)).

The degree of substitution with short-chain acyl group ($DS_{SH}$) and the degree of substitution with long-chain acyl group ($DS_{LO}$) of the obtained long-chain/short-chain-bonded cellulose derivative were measured by using IR (manufactured by JASCO Corporation, product name: FT/IR-4100) according to the measuring method described in Example 1. The measurement result showed that the $DS_{SH}$ was 1.83 and the $DS_{LO}$ was 0.57. Accordingly, from the result based on the IR measurement, the number of residual hydroxy groups per glucose unit (level of residual hydroxy group, $DS_{OH}$) (average value) is estimated to be 0.60 ($DS_{OH}$=0.60).

Here, since the obtained long-chain/short-chain-bonded cellulose derivative was partially soluble in chloroform, the $DS_{SH}$ and the $DS_{LO}$ of the soluble part were measured by using ¹H-NMR (manufactured by Bruker Corporation, product name: AV-400, 400 MHz), the result of which showed that the $DS_{SH}$ was 2.3 and the $DS_{LO}$ was 0.7.

The fluidity and the thermoplasticity (press moldability) of the obtained cellulose derivative were evaluated according to the procedure described in Example 1. The result is shown in Table 1.

Example 4

An activation treatment for cellulose was performed, and thereafter the mixed acid anhydride 1 obtained in Synthesis Example 2 was reacted to afford a long-chain/short-chain-bonded cellulose derivative. Specifically, the long-chain/short-chain-bonded cellulose derivative was made according to the following procedure.

The activation treatment for cellulose was performed according to the same procedure as in Example 1.

A long-chain/short-chain-bonded cellulose derivative was made according to the same procedure as in Example 1 except that dimethylacetamide (DMAc) was used in place of dry pyridine as a solvent used in synthesizing a cellulose derivative (acylation). As the result, 17.7 g of a long-chain/short-chain-bonded cellulose derivative was obtained from the starting raw material (the cellulose content was 6.0 g (0.037 mol/glucose unit)).

The degree of substitution with short-chain acyl group ($DS_{SH}$) and the degree of substitution with long-chain acyl group ($DS_{LO}$) of the obtained long-chain/short-chain-bonded cellulose derivative were measured by using IR (manufactured by JASCO Corporation, product name: FT/IR-4100) according to the measuring method described in Example 1. The measurement result showed that the $DS_{SH}$ was 1.98 and the $DS_{LO}$ was 0.55. Accordingly, from the result based on the IR measurement, the number of residual hydroxy groups per glucose unit (level of residual hydroxy group, $DS_{OH}$) (average value) is estimated to be 0.47 ($DS_{OH}$=0.47).

Here, since the obtained long-chain/short-chain-bonded cellulose derivative was partially soluble in chloroform, the $DS_{SH}$ and the $DS_{LO}$ of the soluble part were measured by using ¹H-NMR (manufactured by Bruker Corporation, product name: AV-400, 400 MHz), the result of which showed that the $DS_{SH}$ was 2.4 and the $DS_{LO}$ was 0.6.

The fluidity and the thermoplasticity (press moldability) of the obtained cellulose derivative were evaluated according to the procedure described in Example 1. The result is shown in Table 1.

Example 5

An activation treatment for cellulose was performed, and thereafter the mixed acid anhydride 1 obtained in Synthesis Example 2 was reacted to afford a long-chain/short-chain-bonded cellulose derivative. Specifically, the long-chain/short-chain-bonded cellulose derivative was made according to the following procedure.

The activation treatment for cellulose was performed according to the same procedure as in Example 1.

A long-chain/short-chain-bonded cellulose derivative was made according to the same procedure as in Example 1 except that dioxane was used in place of dry pyridine as a solvent used in synthesizing a cellulose derivative (acylation). As the result, 7.3 g of a long-chain/short-chain-bonded cellulose derivative was obtained from the starting raw material (the cellulose content was 6.0 g (0.037 mol/glucose unit)).

The degree of substitution with short-chain acyl group ($DS_{SH}$) and the degree of substitution with long-chain acyl group ($DS_{LO}$) of the obtained long-chain/short-chain-bonded cellulose derivative were measured by using IR (manufactured by JASCO Corporation, product name: FT/IR-4100) according to the measuring method described in Example 1. The measurement result showed that the $DS_{SH}$ was 1.70 and the $DS_{LO}$ was 0.32. Accordingly, from the result based on the IR measurement, the number of residual hydroxy groups per glucose unit (level of residual hydroxy group, $DS_{OH}$) (average value) is estimated to be 0.98 ($DS_{OH}$=0.98).

Here, since the obtained long-chain/short-chain-bonded cellulose derivative had an extremely few amount of chloroform-soluble components, the $DS_{SH}$ and the $DS_{LO}$ thereof could not be measured by using $^1$H-NMR.

Evaluation of the fluidity and the thermoplasticity (press moldability) of the obtained cellulose derivative was attempted according to the procedure described in Example 1. However, since the thermoplasticity was insufficient, the flexural test using a pressed test piece could not be performed. The evaluation result of the fluidity is shown in Table 1.

Example 6

An activation treatment for cellulose was performed, and thereafter the mixed acid anhydride 1 obtained in Synthesis Example 2 was reacted to afford a long-chain/short-chain-bonded cellulose derivative. Specifically, the long-chain/short-chain-bonded cellulose derivative was made according to the following procedure.

In 90 mL of dimethylsulfoxide (DMSO) was dispersed 6.37 g (weight including 6.23% of adsorbed moisture: the cellulose content was 6.0 g (0.037 mol/glucose unit)) of cellulose (manufactured by NIPPON PAPER Chemicals CO., LTD., product name: KC Flock, grade: W-50GK). This dispersion was stirred for 2 hours, and the DMSO was removed by using suction filtration for 20 minutes. Thereby, an activation-treated cellulose was obtained.

Using the above activation-treated cellulose a long-chain/short-chain-bonded cellulose derivative was made according to the same procedure as in Example 1 except that N-methylpyrrolidinone (NMP) was used in place of dry pyridine as a solvent used in synthesizing a cellulose derivative (acylation). As the result, 21.2 g of a long-chain/short-chain-bonded cellulose derivative was obtained from the starting raw material (the cellulose content was 6.0 g (0.037 mol/glucose unit)).

The degree of substitution with short-chain acyl group ($DS_{SH}$) and the degree of substitution with long-chain acyl group ($DS_{LO}$) of the obtained long-chain/short-chain-bonded cellulose derivative were measured by using IR (manufactured by JASCO Corporation, product name: FT/IR-4100) according to the measuring method described in Example 1. The measurement result showed that the $DS_{SH}$ was 1.60 and the $DS_{LO}$ was 0.56. Accordingly, from the result based on the IR measurement, the number of residual hydroxy groups per glucose unit (level of residual hydroxy group, $DS_{OH}$) (average value) is estimated to be 0.84 ($DS_{OH}$=0.84).

Here, since the obtained long-chain/short-chain-bonded cellulose derivative was partially soluble in chloroform, the $DS_{SH}$ and the $DS_{LO}$ of the soluble part were measured by using $^1$H-NMR (manufactured by Bruker Corporation, product name: AV-400, 400 MHz), the result of which showed that the $DS_{SH}$ was 2.1 and the $DS_{LO}$ was 0.9.

The fluidity and the thermoplasticity (press moldability) of the obtained cellulose derivative were evaluated according to the procedure described in Example 1. The result is shown in Table 1.

Comparative Example 1

An activation treatment for cellulose was performed, and thereafter the mixed acid anhydride 2 obtained in Synthesis Example 3 was reacted to afford a long-chain/short-chain-bonded cellulose derivative. Specifically, the long-chain/short-chain-bonded cellulose derivative was made according to the following procedure.

A long-chain/short-chain-bonded cellulose derivative was made according to the same procedure as in Example 1 except that the mixture 2 containing the mixed acid anhydride 2 obtained in Synthesis Example 3 was used in place of the mixture 1 containing the mixed acid anhydride 1 obtained in Synthesis Example 2 as a mixture containing a mixed acid anhydride used in synthesizing a cellulose derivative (acylation), and NMP was used in place of dry pyridine as a solvent. As the result, 10.2 g of a long-chain/short-chain-bonded cellulose derivative was obtained from the starting raw material (the cellulose content was 6.0 g (0.037 mol/glucose unit)).

Since the obtained long-chain/short-chain-bonded cellulose derivative had no benzene ring backbone in the long-chain acyl group (stearoyl group), the degree of substitution with short-chain acyl group ($DS_{SH}$) and the degree of substitution with long-chain acyl group ($DS_{LO}$) thereof cannot be measured by using the measurement method with IR described in Example 1.

Since the obtained long-chain/short-chain-bonded cellulose derivative was partially soluble in chloroform, the $DS_{SH}$ and the $DS_{LO}$ of the soluble part were measured by using $^1$H-NMR (manufactured by Bruker Corporation, product name: AV-400, 400 MHz), the result of which showed that the $DS_{SH}$ was 2.9 and the $DS_{LO}$ was 0.1.

Further, evaluation of the fluidity and the thermoplasticity (press moldability) of this sample was attempted according to the procedure described in Example 1. However, since the thermoplasticity was extremely insufficient, the flexural test using a pressed test piece could not be performed. The evaluation result of the fluidity is shown in Table 1.

TABLE 1

| | | Example 1 | Example 2 | Example 3 | Example 4 | Example 5 | Example 6 | Comparative Example 1 |
|---|---|---|---|---|---|---|---|---|
| Short-chain (SH) component | Type | acetyl | acetyl | acetyl | acetyl | acetyl | acetyl | acetyl |
| | Amount of charge (in terms of DS) | 12 | 12 | 12 | 12 | 12 | 12 | 12 |
| Long-chain (LO) component | Type | hydrogenated cardanoxyacetyl | hydrogenated cardanoxyacetyl | hydrogenated cardanoxyacetyl | hydrogenated cardanoxyacetyl | hydrogenated cardanoxyacetyl | hydrogenated cardanoxyacetyl | stearoyl |
| | Amount of charge (in terms of DS) | 3 | 3 | 3 | 3 | 3 | 3 | 3 |
| | Activation solvent for cellulose | water/acetic acid | water/acetic acid | water/acetic acid | water/acetic acid | water/acetic acid | DMSO | water/acetic acid |
| | Solvent species | pyridine | NMP | DMF | DMAc | dioxane | NMP | NMP |
| | Dn | 33.1 | 27.3 | 26.6 | 27.8 | 14.8 | 27.3 | 27.3 |
| Degree of substitution | IR analysis $DS_{SH}$ | 1.97 | 2.02 | 1.83 | 1.98 | 1.70 | 1.60 | — |
| | $DS_{LO}$ | 0.50 | 0.53 | 0.57 | 0.55 | 0.32 | 0.56 | — |
| | NMR analysis $DS_{SH}$ | 2.4 | 2.4 | 2.3 | 2.4 | — | 2.1 | 2.9 |
| | $DS_{LO}$ | 0.5 | 0.6 | 0.7 | 0.6 | — | 0.9 | 0.1 |
| Evaluation result | Fluidity (MFR) [g/10 min] | 667 | 690 | 877 | 726 | 60 | 781 | <0.01 |
| | Thermoplasticity | ○ | ○ | ○ | ○ | Δ | ○ | X |
| | Flexural strength [MPa] | 51 | 50 | 47 | 50 | — | 44 | — |
| | Modulus of elasticity in flexure [GPa] | 1.4 | 1.4 | 1.3 | 1.4 | — | 1.6 | — |

As is clear from comparison of Examples 1 to 4 with Example 5, it can be seen that using a solvent having a large electron pair-donating property (Dn) makes the degree of substitution with long-chain acyl group ($DS_{LO}$) higher to provide a short-chain/long-chain-bonded cellulose derivative excellent in thermoplasticity and strength properties. Further, as is clear from comparison of Example 2 with Example 6, it can be seen that using dimethylsulfoxide as the activation solvent for cellulose provides a cellulose derivative having higher $DS_{LO}$. Furthermore, as is clear from comparison of Examples 1 to 6 with Comparative Example 1, it can be seen that, because the electron-withdrawing property of the long-chain organic group portion in the stearoyl group as the long-chain component is not higher than that of the methyl group portion in the acetyl group as the short-chain component, the $DS_{LO}$ is not enhanced sufficiently, leading to the insufficient improvement of thermoplasticity.

In the foregoing, the present invention has been described with reference to the exemplary embodiments and the Examples; however, the present invention is not limited to the exemplary embodiments and the Examples. Various modifications understandable to those skilled in the art may be made to the constitution and details of the present invention within the scope thereof.

This application claims the right of priority based on Japanese Patent Application No. 2013-173439 filed on 23 Aug. 2013, the entire content of which are incorporated herein by reference.

The invention claimed is:

1. A method for producing a cellulose derivative, comprising reacting a mixed acid anhydride represented by formula (A) with cellulose in the presence of a base catalyst in an organic solvent having an electron pair-donating property to form a cellulose derivative with a first acyl group (—$COR^{SH}$) and a second acyl group (—$COR^{LO}$) introduced at hydroxy groups in the cellulose:

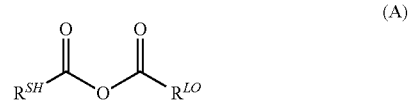

(A)

wherein, in formula (A), $R^{SH}$ represents an organic group having 1 to 3 carbon atom(s); and $R^{LO}$ represents an organic group having an electron-withdrawing property, and wherein, in formula (A), $R^{LO}$ is a group comprising a first organic group bonded to the carbonyl carbon in the mixed acid anhydride, and a second organic group linked to the first organic group through an ether group (—O—), the ether group is bonded to a carbon atom in the first organic group, and the carbon atom is bonded to the carbonyl carbon in the mixed acid anhydride, the first organic group is a methylene group, and the second organic group is a hydrocarbon group having 1 to 24 carbon atom(s).

2. The method for producing a cellulose derivative according to claim 1, wherein, in formula (A), $R^{LO}$ represents an organic group having a higher electron-withdrawing property than that of $R^{SH}$.

3. The method for producing a cellulose derivative according to claim 1, wherein the reaction is performed further in the presence of an acid anhydride represented by ($R^{SH}CO)_2O$.

4. The method for producing a cellulose derivative according to claim 1, wherein the organic solvent has a donor number (Dn) of 10 or more.

5. The method for producing a cellulose derivative according to claim 1, wherein, in formula (A), $R^{SH}$ is a group selected from the group consisting of a methyl group, an ethyl group, a propyl group and an isopropyl group.

6. The method for producing a cellulose derivative according to claim 1, wherein, in formula (A), $R^{SH}$ is a methyl group.

7. The method for producing a cellulose derivative according to claim 1, wherein, in formula (A), $R^{LO}$ includes at least one of a hydrogenated cardanoxymethyl group represented by —$CH_2$—O—$C_6H_4$—$(CH_2)_{14}CH_3$ or —$CH_2$—O—$C_6H_{10}$—$(CH_2)_{14}CH_3$.

8. The method for producing a cellulose derivative according to claim 1, wherein the base catalyst is a nitrogen-containing basic organic compound having a tertiary amine structure.

9. The method for producing a cellulose derivative according to claim 1, wherein the base catalyst is at least one basic compound selected from the group consisting of an amine-based compound, a pyridine-based compound, an imidazole-based compound and an amidine-based compound.

10. The method for producing a cellulose derivative according to claim 1, wherein a degree of substitution with the second acyl group (—$COR^{LO}$) is 0.1 or more; and a total degree of substitution with the first acyl group (—$COR^{SH}$) and the second acyl group (—$COR^{LO}$) ($DS_{SH}+DS_{LO}$) is 2 or more.

11. The method for producing a cellulose derivative according to claim 1, further comprising performing an activation treatment before the reaction is performed, wherein the activation treatment comprises a step of soaking the cellulose in an activation solvent.

12. The method for producing a cellulose derivative according to claim 11, wherein acetic acid or dimethylsulfoxide is used as the activation solvent.

13. The method for producing a cellulose derivative according to claim 1, wherein the cellulose is dispersed in the organic solvent to react with the mixed acid anhydride.

14. A method for producing a cellulose derivative, comprising reacting a mixed acid anhydride represented by formula (A) with cellulose in the presence of a base catalyst in an organic solvent having an electron pair-donating property to form a cellulose derivative with a first acyl group (—$COR^{SH}$) and a second acyl group (—$COR^{LO}$) introduced at hydroxy groups in the cellulose:

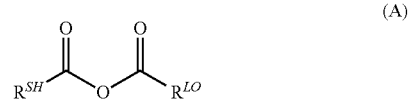

(A)

wherein, in formula (A), $R^{SH}$ represents an organic group having 1 to 3 carbon atom(s); and $R^{LO}$ represents an organic group having an electron-withdrawing property, and wherein, in formula (A), $R^{LO}$ is a hydrogenated cardanoxymethyl group represented by —$CH_2$—O—$C_6H_4$—$(CH_2)_{14}CH_3$ or —$CH_2$—O—$C_6H_{10}$—$(CH_2)_{14}CH_3$.

* * * * *